US010816689B2

(12) United States Patent
Fouda et al.

(10) Patent No.: US 10,816,689 B2
(45) Date of Patent: Oct. 27, 2020

(54) FORMATION RESISTIVITY MEASUREMENT APPARATUS, SYSTEMS, AND METHODS

(71) Applicant: Halliburton Energy Services, Inc., Houston, TX (US)

(72) Inventors: Ahmed Fouda, Houston, TX (US); Luis Emilio San Martin, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 225 days.

(21) Appl. No.: 15/511,191

(22) PCT Filed: Aug. 18, 2015

(86) PCT No.: PCT/US2015/045726
§ 371 (c)(1),
(2) Date: Mar. 14, 2017

(87) PCT Pub. No.: WO2016/057122
PCT Pub. Date: Apr. 14, 2016

(65) Prior Publication Data
US 2017/0248728 A1    Aug. 31, 2017

Related U.S. Application Data

(60) Provisional application No. 62/062,723, filed on Oct. 10, 2014, provisional application No. 62/062,726, (Continued)

(51) Int. Cl.
*G01V 3/20* (2006.01)
*E21B 47/024* (2006.01)
(Continued)

(52) U.S. Cl.
CPC .................. *G01V 3/20* (2013.01); *E21B 7/04* (2013.01); *E21B 44/005* (2013.01);
(Continued)

(58) Field of Classification Search
CPC .. G01V 3/20; G01V 3/24; E21B 49/00; E21B 44/005; E21B 7/04; E21B 47/024; E21B 49/087; E21B 47/12
See application file for complete search history.

(56) References Cited

U.S. PATENT DOCUMENTS

| 4,282,486 A | 8/1981 | Culver et al. |
| 8,390,295 B2 | 3/2013 | Gorek et al. |

(Continued)

FOREIGN PATENT DOCUMENTS

| WO | 2014011186 A1 | 1/2014 |
| WO | 2016057122 A1 | 4/2016 |

OTHER PUBLICATIONS

"International Application Serial No. PCT/US2015/045726, International Search Report dated Nov. 20, 2015", 3 pgs.

(Continued)

*Primary Examiner* — Regis J Betsch
*Assistant Examiner* — Jeremy A Delozier
(74) *Attorney, Agent, or Firm* — Gilliam IP PLLC

(57) ABSTRACT

Apparatus, systems, and methods may operate to correct measured voltage data for selected weak differential measurements to provide corrected voltage data. Additional activity may include adjusting the corrected voltage data to remove level shifts in the measured voltage data caused by downhole tool impedance to provide adjusted voltage data, converting the adjusted voltage data into apparent resistivity data, inverting the apparent resistivity data to determine true resistivity values for a geological formation, and operating a controlled device according to the true resistivity values for the geological formation. Additional apparatus, systems, and methods are disclosed.

21 Claims, 19 Drawing Sheets

Related U.S. Application Data filed on Oct. 10, 2014, provisional application No. 62/132,663, filed on Mar. 13, 2015.

(51) Int. Cl.
*E21B 7/04* (2006.01)
*E21B 44/00* (2006.01)
*E21B 49/00* (2006.01)
*G01V 3/24* (2006.01)
*E21B 49/08* (2006.01)
*E21B 47/12* (2012.01)

(52) U.S. Cl.
CPC ............ *E21B 47/024* (2013.01); *E21B 49/00* (2013.01); *E21B 49/087* (2013.01); *G01V 3/24* (2013.01); *E21B 47/12* (2013.01)

(56) References Cited

U.S. PATENT DOCUMENTS

| | | | |
|---|---|---|---|
| 2001/0033164 A1* | 10/2001 | Vinegar | E21B 17/003 |
| | | | 324/312 |
| 2004/0133351 A1* | 7/2004 | Frenkel | G01V 3/20 |
| | | | 702/7 |
| 2012/0274329 A1 | 11/2012 | Tabarovsky et al. | |
| 2013/0257436 A1 | 10/2013 | Bittar | |
| 2015/0177406 A1* | 6/2015 | Li | G01V 3/20 |
| | | | 702/7 |

OTHER PUBLICATIONS

"International Application Serial No. PCT/US2015/045726, Written Opinion dated Nov. 20, 2015", 7 pgs.

* cited by examiner

|  | [Ohm-m] | Ideal Tool | Real Tool | | |
|---|---|---|---|---|---|
|  |  | No leakage current | Neglect leakage current | Exact leakage current | Approx. leakage current |
| Rf = 1000 Ohm-m | Ra1 | 478.8183 | 449.8152 | 478.8183 | 478.7518 |
|  | Ra2 | 978.2682 | 831.6208 | 978.2682 | 977.648 |
|  | Ra3 | 974.2172 | 803.7821 | 974.2172 | 972.9682 |
|  | Ra4 | 986.8191 | 790.7978 | 986.8191 | 984.5203 |
|  | Ra5 | 962.8064 | 747.4853 | 962.8064 | 958.7776 |
| Rf = 10,000 Ohm-m | Ra1 | 886.5833 | 792.3717 | 886.5833 | 886.545 |
|  | Ra2 | 9024.392 | 3445.859 | 9024.392 | 9018.924 |
|  | Ra3 | 8853.998 | 3037.475 | 8853.998 | 8842.982 |
|  | Ra4 | 9321.291 | 2806.976 | 9321.291 | 9299.672 |
|  | Ra5 | 9490.37 | 2495.921 | 9490.37 | 9449.152 |

Fig. 12

|  | % Error | Real Tool | | |
|---|---|---|---|---|
|  |  | Neglect leakage current | Exact leakage current | Approx. leakage current |
| Rf = 1000 Ohm-m | Ra1 | 6.057238 | 1.31E-09 | 0.013894 |
|  | Ra2 | 14.99051 | 5.43E-10 | 0.063398 |
|  | Ra3 | 17.49457 | 8.33E-10 | 0.128204 |
|  | Ra4 | 19.86396 | 6.63E-10 | 0.232953 |
|  | Ra5 | 22.3639 | 5.15E-11 | 0.418445 |
| Rf = 10,000 Ohm-m | Ra1 | 10.62637 | 3.42E-09 | 0.004321 |
|  | Ra2 | 61.69375 | 2.04E-08 | 0.060596 |
|  | Ra3 | 65.69375 | 6.24E-09 | 0.124418 |
|  | Ra4 | 69.88641 | 3.19E-09 | 0.231922 |
|  | Ra5 | 73.70049 | 7.26E-10 | 0.434316 |

Fig. 13

FORMATION RESISTIVITY MEASUREMENT APPARATUS, SYSTEMS, AND METHODS

CROSS-REFERENCE TO RELATED APPLICATIONS

This application claims priority to U.S. Provisional Patent Application Ser. 62/062,723, filed Oct. 10, 2014. This application also claims priority to U.S. Provisional Patent Application Ser. 62/062,726, filed Oct. 10, 2014. This application also claims priority to U.S. Provisional Patent Application Ser. 62/132,663, filed Mar. 13, 2015. These priority applications are hereby incorporated herein by reference in their entirety.

BACKGROUND

Understanding the structure and properties of geological formations can reduce the cost of drilling wells for oil and gas exploration. Measurements are typically performed in a borehole (i.e., downhole measurements) in order to attain this understanding. A variety of sensors and mounting configurations may be used, including those associated with resistivity tools, to obtain such measurements. These tools are widely used in oil field exploration applications to determine zones in a formation that may contain hydrocarbons, because the accurate determination of formation resistivity is frequently useful in assessing the feasibility of production for a particular well. However, measurements made by the tool can be affected by factors other than the formation resistivity.

For example, laterolog tools can be used in downhole logging applications to inject current directly into the formation. The formation resistivity is then determined by measuring the voltage drop across monitor electrodes on the tool. In order to obtain different depths of investigation, array laterolog tools (ALAT), with a plurality of current and measurement electrodes, are often used.

The voltages measured by a particular monitor electrode may be quite low when the monitor electrode is not located between the current emitting electrode and the current return electrode, and the formation resistivity is much larger than the mud resistivity. In such cases, the measurements may be corrupted by system and environmental factors, which can greatly affect the calculated apparent resistivity results.

BRIEF DESCRIPTION OF THE DRAWINGS

FIGS. 12 and 13 are tables showing a comparison of illustrative numerical results of a real electrode-based tool with numerical results of an ideal electrode-based tool.

DETAILED DESCRIPTION

Disclosed herein are methods and systems for analysis of electrode-based tool measurements using model-based leakage currents. The model-based leakage currents may be applied to focusing equations or other processing steps performed to derive electromagnetic properties (e.g., resistivity, conductivity, etc.) of a formation from measurements collected by an electrode-based tool in a downhole environment. Accounting for leakage currents as described herein improves the accuracy of derived electromagnetic properties compared to ignoring leakage currents or otherwise assuming such leakage currents are negligible.

Figure 1:
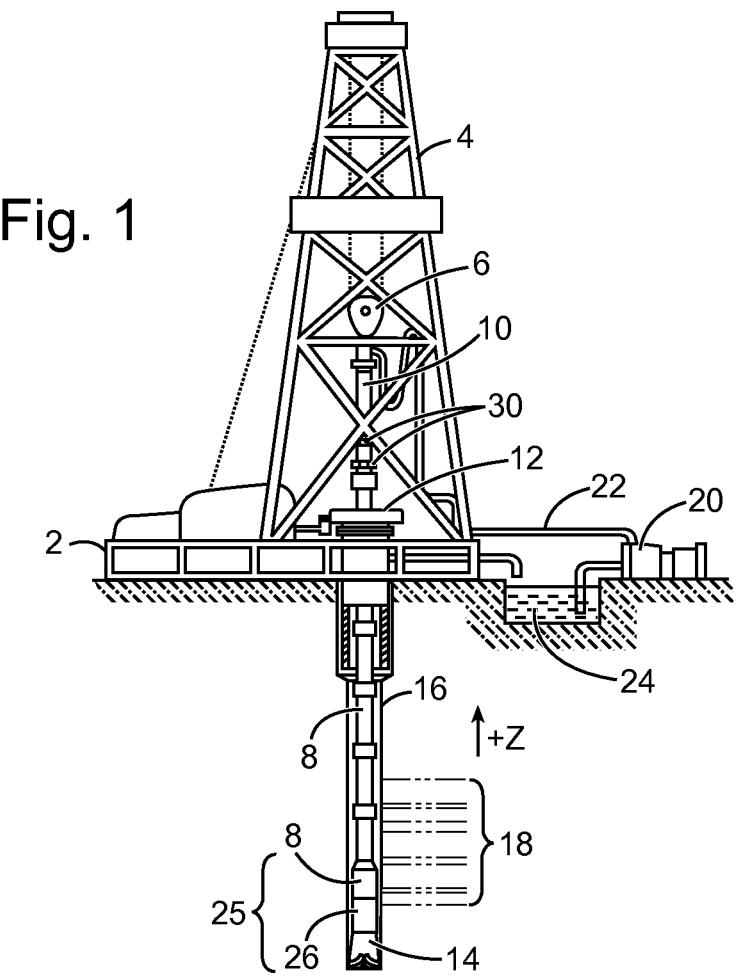
FIG. 1 is a schematic diagram showing an illustrative logging while drilling ("LWD") environment.

The disclosed systems and methods are best understood in an application context. Turning now to the figures, FIG. 1 shows an illustrative logging while drilling (LWD) environment. A drilling platform 2 is equipped with a derrick 4 that supports a hoist 6 for raising and lowering a drill string 8. The hoist 6 suspends a top drive 10 suitable for rotating the drill string 8 and lowering the drill string through the well head 12. Connected to the lower end of the drill string 8 is a drill bit 14. As bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via the annulus around drill string 8, and into a retention pit 24. The drilling fluid transports cuttings from the borehole into the pit 24 and aids in maintaining the integrity of the borehole 16. Various materials can be used for drilling fluid, including a salt-water based conductive mud.

A LWD tool suite 26 is integrated into the bottom-hole assembly near the bit 14. As the bit extends the borehole through the formations, logging tool 26 collects measurements relating to various formation properties as well as the tool orientation and various other drilling conditions. The LWD tools 26 may take the form of a drill collar, i.e., a thick-walled tubular that provides weight and rigidity to aid the drilling process. (For the present discussion, the set of logging tools is expected to include a multi-array laterolog resistivity tool to measure formation resistivity.) A telemetry sub 28 may be included to transfer images and measurement data to a surface receiver 30 and to receive commands from the surface. In some embodiments, the telemetry sub 28 does not communicate with the surface, but rather stores logging data for later retrieval at the surface when the logging assembly is recovered.

Figure 2:
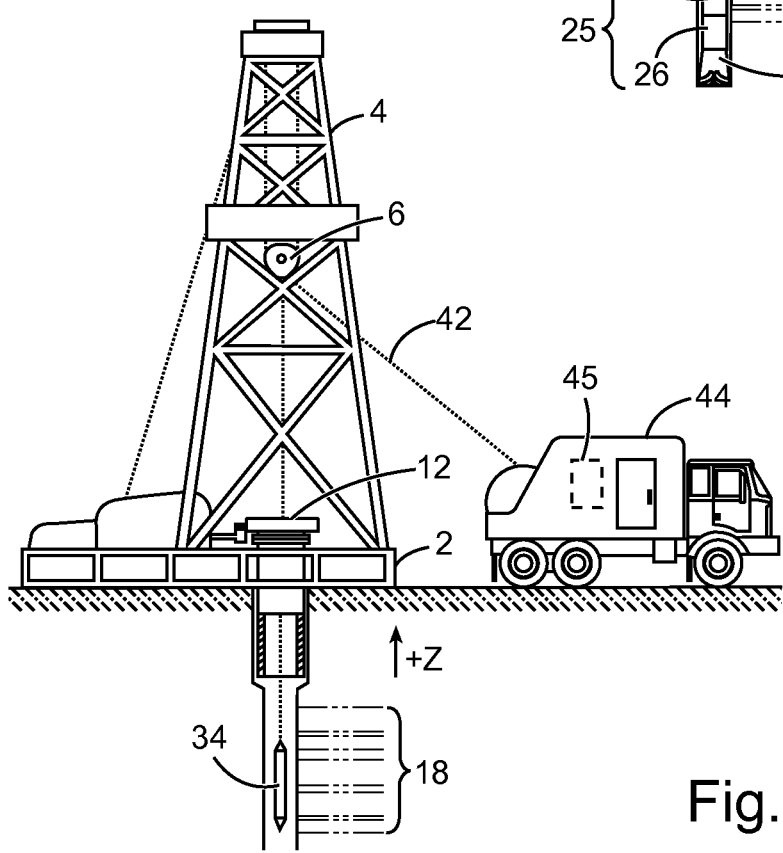
FIG. 2 is a schematic diagram showing an illustrative wireline logging environment.

At various times during the drilling process, the drill string 8 may be removed from the borehole as shown in FIG. 2. Once the drill string has been removed, logging operations can be conducted using a wireline logging sonde 34, i.e., a probe suspended by a cable 42 having conductors for transporting power to the sonde and telemetry from the sonde to the surface. A wireline logging sonde 34 may have pads and/or centralizing springs to maintain the tool near the axis of the borehole as the tool is pulled uphole. Logging sonde 34 can include a variety of sensors including a multi-array laterolog tool for measuring formation resistivity. A logging facility 44 collects measurements from the logging sonde 34, and includes a computer system 45 for processing and storing the measurements gathered by the sensors.

Figure 3:
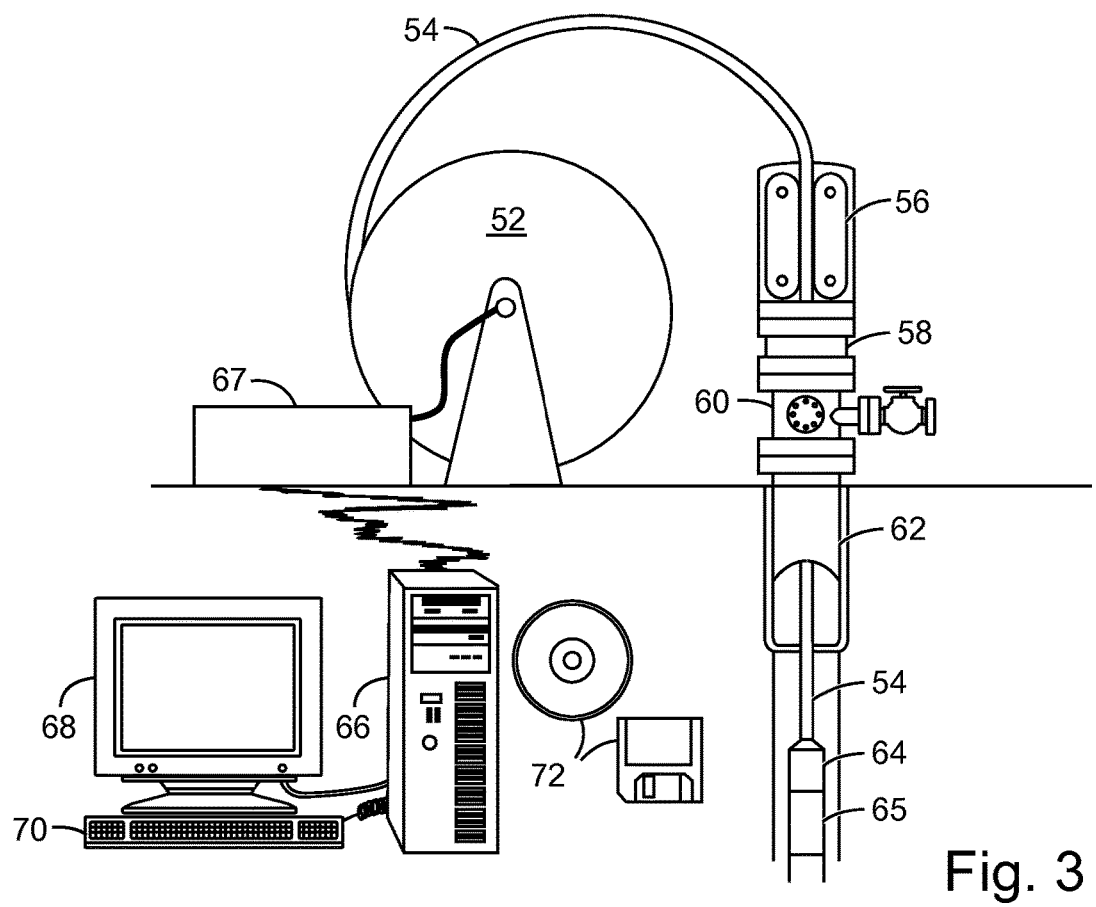
FIG. 3 is a schematic diagram showing an illustrative tubing-conveyed logging environment.

An alternative logging technique is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the well 62. In the well, a supervisory sub 64 and one or more logging tools 65 are coupled to the coil tubing 54 and configured to communicate to a surface computer system 66 via information conduits or other telemetry channels. An uphole interface 67 may be provided to exchange communications with the supervisory sub and receive data to be conveyed to the surface computer system 66.

Surface computer system 66 is configured to communicate with supervisory sub 64 to set logging parameters and collect logging information from the one or more logging tools 65 such as a multi-array laterolog tool. Surface computer system 66 is configured by software (shown in FIG. 3 in the form of removable storage media 72) to monitor and control downhole instruments 64, 65. System 66 includes a display device 68 and a user-input device 70 to enable a human operator to interact with the system control software 72. Slickline logging is another alternative for conveying an electrode-based tool.

In each of the foregoing logging environments, the logging tool assemblies may include a navigational sensor package having directional sensors for determining the inclination angle, the horizontal angle, and the rotational angle (a.k.a. "tool face angle") of the bottomhole assembly (BHA) 25. As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the BHA 25 can be determined. Additionally, a three axis magnetometer measures the earth's magnetic field vector in a similar manner. From the combined magnetometer and accelerometer data, the horizontal angle of the BHA 25 may be determined.

Figure 4:
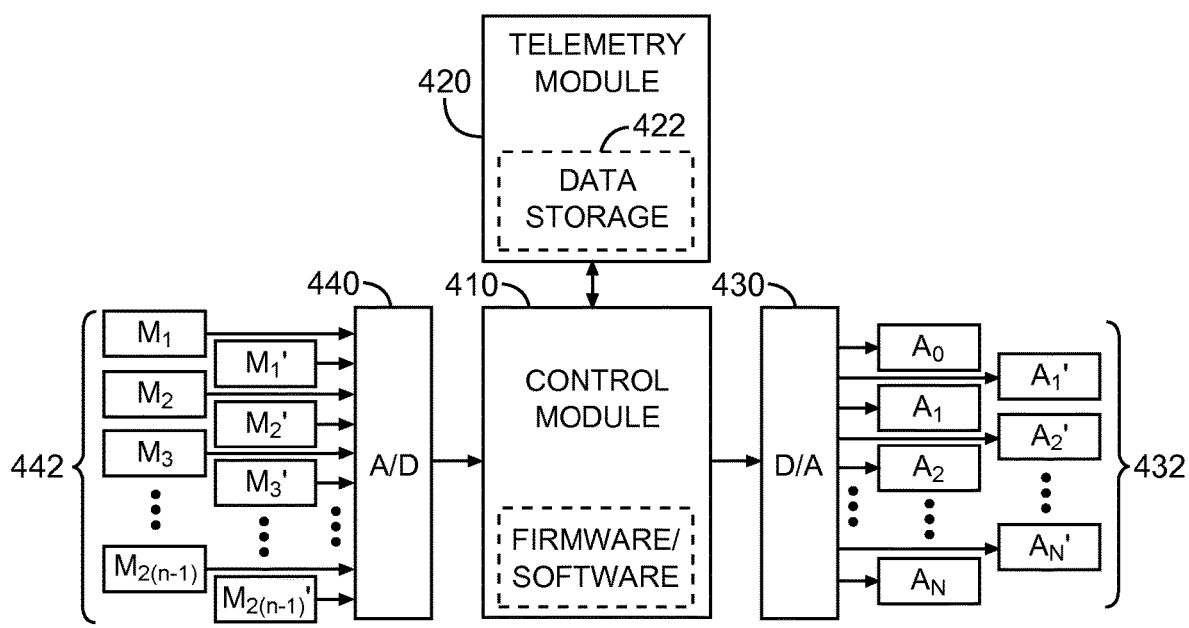
FIG. 4 is a schematic diagram showing a block diagram of an illustrative multi-array laterolog tool.

A discussion of the multi-array laterolog tool electronics is in order before describing the physical construction of the tool. FIG. 4 shows a functional block diagram of the tool electronics. The control module 410 governs the operation of the tool in accordance with software and/or firmware 412 stored in internal memory. The control module 410 couples to telemetry module 420 to receive commands and to provide measurement data. Control module 410 further connects to digital-to-analog converter 430 to drive current electrodes 432, and connects to analog-to-digital converter 440 to make voltage measurements via voltage monitoring electrodes 442. Control module 410 can be, for example, a general purpose processor, a digital signal processor, a programmable gate array, or an application specific integrated circuit. Telemetry module 420 receives and stores measurement data in a nonvolatile memory 422, and further operates as a communications interface between the control module 410 and the telemetry communications mechanism.

FIG. 4 shows 2N+1 current electrodes (electrodes A0, A1, A2, . . . AN, A1', A2', . . . AN') being independently driven via digital-to-analog converter 430. In some tool embodiments, the current electrodes are electrically connected in pairs, i.e., electrode A1 is connected to electrode A1' by an electrical conductor, electrode A2 is connected to electrode A2', etc. Moreover, the return electrodes are electrically connected (i.e., electrode AN is conductively coupled to electrode AN'). In such alternative embodiments, the digital-to-analog converter can be simplified to drive only one electrode in each pair. Similarly, the voltage monitoring electrodes 442 can be electrically connected in pairs, i.e., with electrode M1 connected to M1', electrode M2 connected to M2', etc. It is also contemplated that each electrode can be individually driven/sensed and that the control module can collect the pair-wise measurements by appropriately combining the individual electrode currents and voltages.

Figure 5:
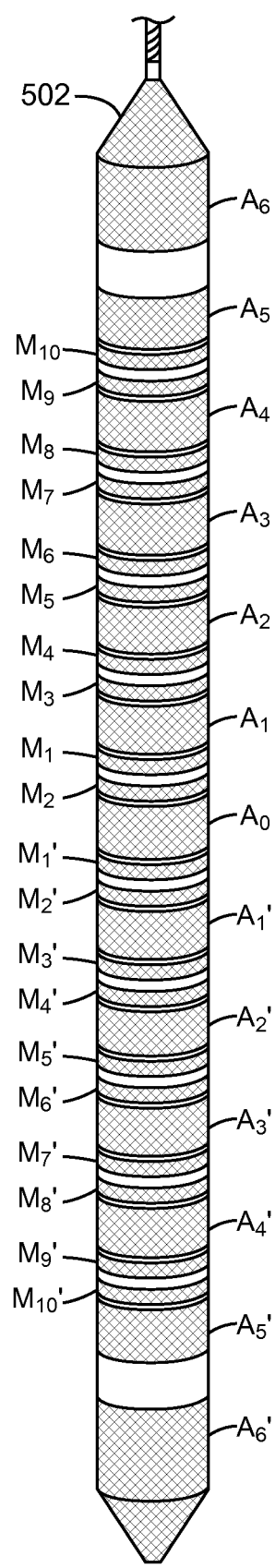
FIG. 5 is a diagram showing an illustrative multi-array laterolog tool.

FIG. 5 shows an illustrative multi-array laterolog tool 502 having (for the sake of illustration) equally-spaced current electrodes and return electrodes (electrodes A0, A1, A2, . . . A6, A1', A2', . . . A6'), with interspersed voltage monitoring electrodes M1-M10 and M1'-M10' on a wireline tool body. (It is desirable to separate the voltage monitoring electrodes from the current electrodes because the current electrodes often develop an impedance layer that distorts voltage measurements when current is flowing.) In practice, the electrodes are not equally sized and spaced. Better performance is achieved by having the more distant electrode increase in size.

Figure 6:
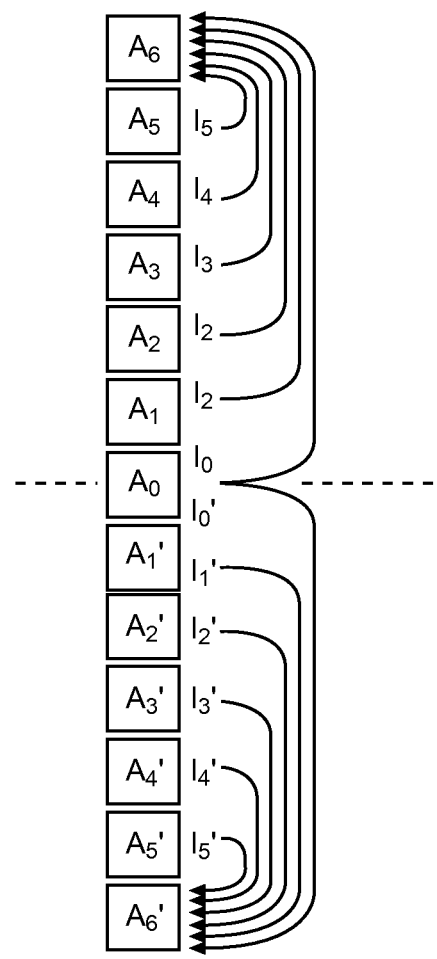
FIG. 6 is a schematic diagram showing an illustrative current flow pattern for a laterolog tool with various current electrodes.

The tool electronics employ the current electrodes to provide the currents I0-I5 and I0'-I5' as illustrated in FIG. 6. Currents I0-I5 are sourced from electrodes A0-A5 respectively, with electrode A6 serving as a common return electrode for each of these currents. Similarly, currents I0'-I5' are sourced from electrodes A0 and A1'-A5' respectively, with electrode A6' also serving as a common return electrode for the currents. If the current and voltage monitoring electrodes are pair-wise connected as discussed before, the tool cannot distinguish currents I0-I5 from I0'-I5', but instead operates on the combined currents (I0+I0', I1+I1', I2+I2', . . . ). Otherwise, the tool can analyze currents I0-I5 separately from I0'-I5', or in the alternative, combine the currents and voltages digitally before analyzing. Due to the symmetry of the array, only the top half is illustrated in the ensuing figures. Though not shown, the bottom half is presumed to be present.

To enable the voltage monitoring electrodes to distinguish the effects of the various currents, the currents are given distinguishable features. For example, the electrodes may be pair-wise, connected and currents I0-I5 have distinguishable signal frequencies f1-f6. Alternatively, the currents could be distinguished through the use of time division multiplexing, code division multiplexing, or other methods that enable the currents to be independently monitored.

While each of the currents is provided with a characteristic that makes its effects distinguishable from those of the other currents, in at least some tool embodiments some of the currents are given common features. For example, some tool embodiments provide current I0 with frequencies f1 and f2. The sharing of frequency f2 by both current I0 and I1 enables straightforward hardware focusing.

As the tool drives current from the current electrodes, the currents pass through the borehole fluid and the formation to reach the return electrodes, creating a field potential indicative of the resistivity of the materials along the various current flow paths. The control module 410 records a voltage signal from each of the voltage monitoring electrodes 442 to measure the field potential at the voltage monitoring electrode locations. A frequency analysis of the voltage signals (e.g., by Fourier transform, filtering, or least-squares curve fitting) separates out those voltage signal components attributable to each of the currents.

With the measurements for the current flow pattern of FIG. 6, it becomes possible to derive the measurements associated with various current flow patterns. For more information regarding measurement analysis options for a laterolog tool, reference may be had to WO 2012/067599, entitled "Multi-array Laterolog Tools and Methods", and to WO 2012/067817, entitled "Multi-array Laterolog Tools and Methods with Differential Voltage Measurements."

In the different modes of operation of an array laterolog tool (e.g., the tool represented in FIGS. 4-6), different current flows are established between current electrodes, and voltages are measured at the voltage monitoring electrodes. For example, if a mode of operation corresponds to a current flowing between current electrodes $A_0$ and $A_6$ through the formation, the current should flow only between these two electrodes and it should not enter into another current electrode and from there reach the current return. In ideal tools the impedance internal through the tool between any of the current electrodes different from A6 and the point of current return should be infinite, but in real tools this condition can only be approximated. Thus, in real tools there is always some current that enters the other current electrodes and from there reaches the current return. The same is true for the voltage electrodes, but for simplification the disclosed methods and systems are directed to leakage current related to non-ideal current electrodes.

Figure 7A:
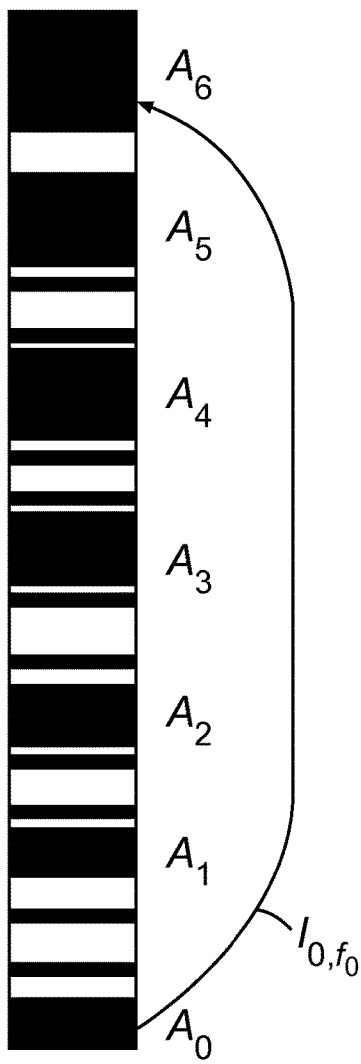
FIG. 7A is a schematic diagram showing a current flow pattern between electrodes of a laterolog tool without internal leakage currents.
Figure 7B:
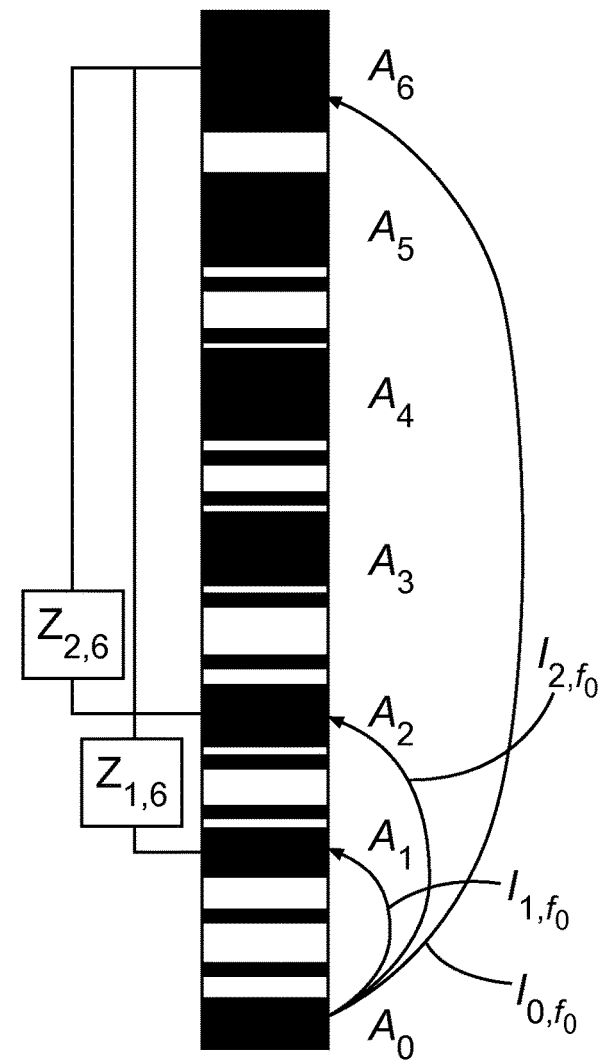
FIG. 7B is a schematic diagram showing a current flow pattern between electrodes of a laterolog tool with internal leakage currents.

The difference between ideal and real tools is illustrated schematically in FIGS. 7A and 7B. More specifically, FIG. 7A shows a current flow pattern between electrodes A0 and A6 without internal leakage currents. Meanwhile, FIG. 7B shows a current flow pattern between electrodes A0 and A6 with internal leakage currents due to a non-infinite impedance between A1 and A6 (labeled $Z_{1,6}$) and due to a non-infinite impedance between A2 and A6 (labeled $Z_{2,6}$). To account for non-infinite internal impedances between the different electrodes and the current return for the different modes of operation of the tool, the equations that describe the relationship between currents and voltages can be modified. These modifications can be used to evaluate corrections to improve tool accuracy. As an example, the original linear system of equations may be modified into another higher dimensional linear system of equations that now includes all the couplings, not only those that are present in the ideal tool.

As an example, in software focusing methods, multiple modes of operation are run simultaneously at different frequencies, with each current electrode emitting current at a single frequency. The emitted current is measured for use in the focusing equations. In addition, the currents that flow into non-active current electrodes may be taken into account. In accordance with at least some embodiments, the currents that flow into non-active current electrodes correspond to model-based leakage currents as described herein.

Without limitation to other uses of model-based leakage currents, an example is now provided for applying model-based leakage currents to modified equations for software focusing. The modified software focusing equations are as follows:

Modified Focused Mode 1:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \sum_{i=0}^{2} I_{i,f_0} & \sum_{i=0}^{2} I_{i,f_2} & \sum_{i=0}^{2} I_{i,f_3} & \sum_{i=0}^{2} I_{i,f_4} & \sum_{i=0}^{2} I_{i,f_5} \\ I_{3,f_0} & I_{3,f_2} & I_{3,f_3} & I_{3,f_4} & I_{3,f_5} \\ I_{4,f_0} & I_{4,f_2} & I_{4,f_3} & I_{4,f_4} & I_{4,f_5} \\ I_{5,f_0} & I_{5,f_2} & I_{5,f_3} & I_{5,f_4} & I_{5,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\sum_{i=0}^{2} I_{i,f_1} \\ -I_{3,f_1} \\ -I_{4,f_1} \\ -I_{5,f_1} \end{bmatrix}$$

$$V_1 = C_0 V_{1,f_0} + V_{1,f_1} + C_2 V_{1,f_2} + C_3 V_{1,f_3} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_1} = k_1 \frac{V_1}{I_0}$$

For Modified Focused Mode 1, the frequencies $f_0$, $f_1$, . . . , $f_5$ denote different current excitation patterns. For example, $f_0$ denotes injecting current from $A_0$ and returning to $A_6$, $f_1$ denotes injecting current from $A_1$ and returning to $A_6$, and so on. Excitations can be made simultaneously at different frequencies, or sequentially using one frequency or more. These are referred to as the unfocused modes. $V_{i,f_j}$ is the voltage of the $i^{th}$ voltage monitoring electrode, with respect to the reference, when the tool is excited with frequency $f_j$. $\Delta V_{1,2,f_j}$ is the potential difference between voltage monitoring electrodes 1 and 2 when the tool is excited with frequency $f_j$. $I_{1,f_j}$ is the current injected from electrode $A_1$ when the tool is excited with frequency $f_j$. The adopted sign convention is such that $I_{1,f_j}$ is positive if it is injected from the electrode into the formation; and negative if it is returning into the electrode. Further, $k_1$ is the tool constant of Modified Focused Mode 1.

Modified Focused Mode 2:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \sum_{i=0}^{3} I_{i,f_0} & \sum_{i=0}^{3} I_{i,f_2} & \sum_{i=0}^{3} I_{i,f_3} & \sum_{i=0}^{3} I_{i,f_4} & \sum_{i=0}^{3} I_{i,f_5} \\ I_{4,f_0} & I_{4,f_2} & I_{4,f_3} & I_{4,f_4} & I_{4,f_5} \\ I_{5,f_0} & I_{5,f_2} & I_{5,f_3} & I_{5,f_4} & I_{5,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\sum_{i=0}^{3} I_{i,f_1} \\ -I_{4,f_1} \\ -I_{5,f_1} \end{bmatrix}$$

$$V_1 = C_0 V_{1,f_0} + V_{1,f_1} + C_2 V_{1,f_2} + C_3 V_{1,f_1} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_2} = k_2 \frac{V_1}{I_0}$$

Modified Focused Mode 3:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \Delta V_{5,6,f_0} & \Delta V_{5,6,f_2} & \Delta V_{5,6,f_3} & \Delta V_{5,6,f_4} & \Delta V_{5,6,f_5} \\ \sum_{i=0}^{4} I_{i,f_0} & \sum_{i=0}^{4} I_{i,f_2} & \sum_{i=0}^{4} I_{i,f_3} & \sum_{i=0}^{4} I_{i,f_4} & \sum_{i=0}^{4} I_{i,f_5} \\ I_{5,f_0} & I_{5,f_2} & I_{5,f_3} & I_{5,f_4} & I_{5,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\Delta V_{5,6,f_1} \\ -\sum_{i=0}^{4} I_{i,f_1} \\ -I_{5,f_1} \end{bmatrix}$$

$$V_1 = C_0 V_{1,f_0} + V_{1,f_1} + C_2 V_{1,f_2} + C_3 V_{1,f_1} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_3} = k_3 \frac{V_1}{I_0}$$

Modified Focused Mode 4:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \Delta V_{5,6,f_0} & \Delta V_{5,6,f_2} & \Delta V_{5,6,f_3} & \Delta V_{5,6,f_4} & \Delta V_{5,6,f_5} \\ \Delta V_{7,8,f_0} & \Delta V_{7,8,f_2} & \Delta V_{7,8,f_3} & \Delta V_{7,8,f_4} & \Delta V_{7,8,f_5} \\ \sum_{i=0}^{4} I_{i,f_0} & \sum_{i=0}^{4} I_{i,f_2} & \sum_{i=0}^{4} I_{i,f_3} & \sum_{i=0}^{4} I_{i,f_4} & \sum_{i=0}^{4} I_{i,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\Delta V_{5,6,f_1} \\ -\Delta V_{7,8,f_1} \\ -\sum_{i=0}^{4} I_{i,f_1} \end{bmatrix}$$

$$V_1 = C_0 V_{1,f_0} + V_{1,f_1} + C_2 V_{1,f_2} + C_3 V_{1,f_1} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_4} = k_4 \frac{V_1}{I_0}$$

Modified Focused Mode 5:

$$\begin{bmatrix} \Delta V_{1,2,f_0} & \Delta V_{1,2,f_2} & \Delta V_{1,2,f_3} & \Delta V_{1,2,f_4} & \Delta V_{1,2,f_5} \\ \Delta V_{3,4,f_0} & \Delta V_{3,4,f_2} & \Delta V_{3,4,f_3} & \Delta V_{3,4,f_4} & \Delta V_{3,4,f_5} \\ \Delta V_{5,6,f_0} & \Delta V_{5,6,f_2} & \Delta V_{5,6,f_3} & \Delta V_{5,6,f_4} & \Delta V_{5,6,f_5} \\ \Delta V_{7,8,f_0} & \Delta V_{7,8,f_2} & \Delta V_{7,8,f_3} & \Delta V_{7,8,f_4} & \Delta V_{7,8,f_5} \\ \Delta V_{9,10,f_0} & \Delta V_{9,10,f_2} & \Delta V_{9,10,f_3} & \Delta V_{9,10,f_4} & \Delta V_{9,10,f_5} \end{bmatrix} \begin{bmatrix} C_0 \\ C_2 \\ C_3 \\ C_4 \\ C_5 \end{bmatrix} = \begin{bmatrix} -\Delta V_{1,2,f_1} \\ -\Delta V_{3,4,f_1} \\ -\Delta V_{5,6,f_1} \\ -\Delta V_{7,8,f_1} \\ -\Delta V_{9,10,f_1} \end{bmatrix}$$

$$V_1 = C_0 V_{1,f_0} + V_{1,f_1} + C_2 V_{1,f_2} + C_3 V_{1,f_1} + C_4 V_{1,f_4} + C_5 V_{1,f_5}$$

$$I_0 = C_0 I_{0,f_0} + I_{0,f_1} + C_2 I_{0,f_2} + C_3 I_{0,f_3} + C_4 I_{0,f_4} + C_5 I_{0,f_5}$$

$$R_{a_5} = k_5 \frac{V_1}{I_0}$$

In accordance with at least some embodiments, model-based leakage currents are obtained without modifying the electrode-based tool. For example, the model-based leakage currents may be based on a surface characterization of the internal impedances between each current electrode and the return electrode at all frequencies of operation of an electrode-based tool, and over the temperature range expected downhole. Currents leaking into or out of non-active current electrodes can then be computed from measured internal impedances and measured voltages at the voltage monitoring electrodes closest to the non-active current electrode. Note that the voltages of the current electrodes are not measured by the tool, and therefore can only be estimated from the measured voltages at the closest voltage monitoring electrodes.

For example, referring to the laterolog tool represented in FIGS. 4-6, model-based leakage currents for non-active electrodes can be approximated as follows:

$$I_{0,f_j} \approx -\frac{V_{M_1,f_j} - 0}{Z_{06,f_j}}, j \neq 0$$

$$I_{1,f_j} \approx -\frac{V_{M_3,f_j} - 0}{Z_{16,f_j}}, j \neq 1$$

$$I_{2,f_j} \approx -\frac{(V_{M_4,f_j} + V_{M_5,f_j})/2 - 0}{Z_{26,f_j}}, j \neq 2$$

$$I_{3,f_j} \approx -\frac{(V_{M_4,f_j} + V_{M_5,f_j})/2 - 0}{Z_{36,f_j}}, j \neq 3$$

$$I_{4,f_j} \approx -\frac{(V_{M_8,f_j} + V_{M_9,f_j})/2 - 0}{Z_{46,f_j}}, j \neq 4$$

$$I_{5,f_j} \approx -\frac{V_{M_{10},f_j} - 0}{Z_{56,f_j}}, j \neq 5$$

model-based leakage current equations

From the above model-based leakage currents, various observations can be made including:
  Current is negative if it is leaking into the electrode, according to the adopted sign convention.
  The voltage of the return electrode ($A_6$ in the example of FIG. 2) is approximated as the voltage of the armor (voltage reference).
  The internal impedance varies with frequency, in general, and hence different sets of impedance are used for modes with different frequencies.
  Also, as the internal impedance varies with temperature, different sets of impedance values are needed for different downhole temperatures.

Figure 8:
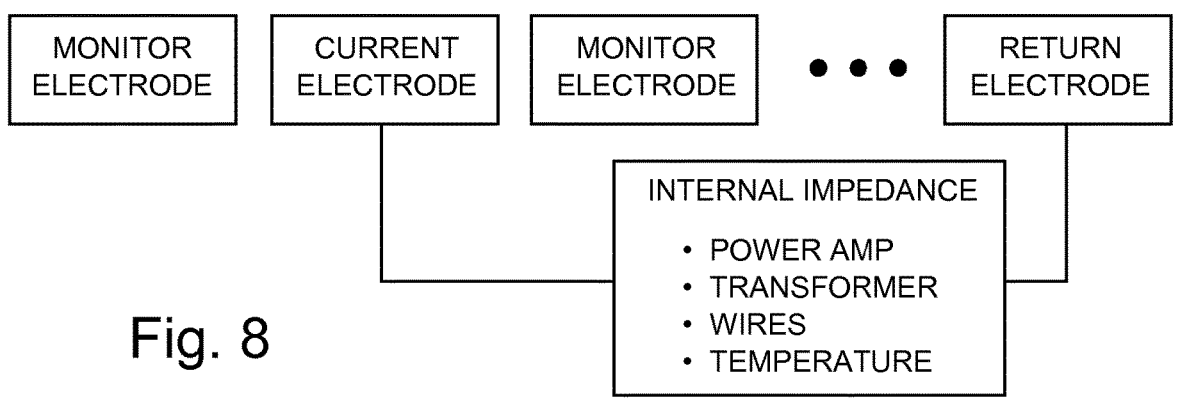
FIG. 8 is a block diagram showing some components of an electrode-based tool.

FIG. 8 is a block diagram showing some components of an electrode-based tool. In FIG. 8, a current electrode (e.g., any of A1-A5 or A1'-A5') and a return electrode (A6 or A6') are represented. Further, an internal impedance between the current electrode and return electrode are represented. Further, voltage monitoring electrodes (e.g., a pair selected from M1-M10 or M1'-M10') adjacent to the current electrode are represented. In at least some embodiments, the internal impedance between the represented current electrode and return electrode is a function of power amplifier characteristics, transformer characteristics, wires, and an ambient temperature. The power amplifier, the transformer, and/or other electronics contributing to the internal impedance between the represented current electrode and return electrode may be components mounted to a printed circuit board (PCB). Further, the wires may correspond to insulated wires or traces between the current electrode, a PCT, components mounted on a PCT, and return electrode.

Figure 9:
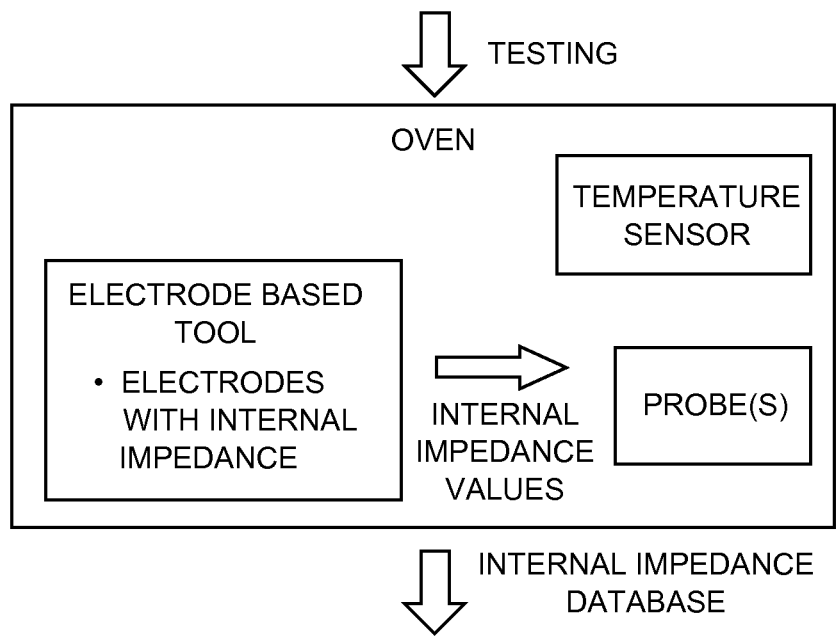
FIG. 9 is a block diagram showing an illustrative testing scenario to derive an internal impedance database or model for an electrode-based tool.

To characterize the internal impedance between current electrodes and return electrode, testing may be performed at earth's surface before deploying an electrode-based tool. As illustrated in FIG. 9, such testing may involve placing an electrode-based tool in an oven and measuring internal impedance values with one or more probes. As desired, the probes may be internal or external to the electrode-based tool. Further, a temperature sensor may collect temperature measurements during the testing operations. The testing results in an internal impedance database that stores the internal impedances for current electrodes relative to a return electrode as a function of temperature. Alternatively, the internal impedance values obtained through testing operations may be used to derive an internal impedance curve or model from which internal impedances for current electrodes relative to a return electrode can be derived as a function of temperature.

Figure 10:
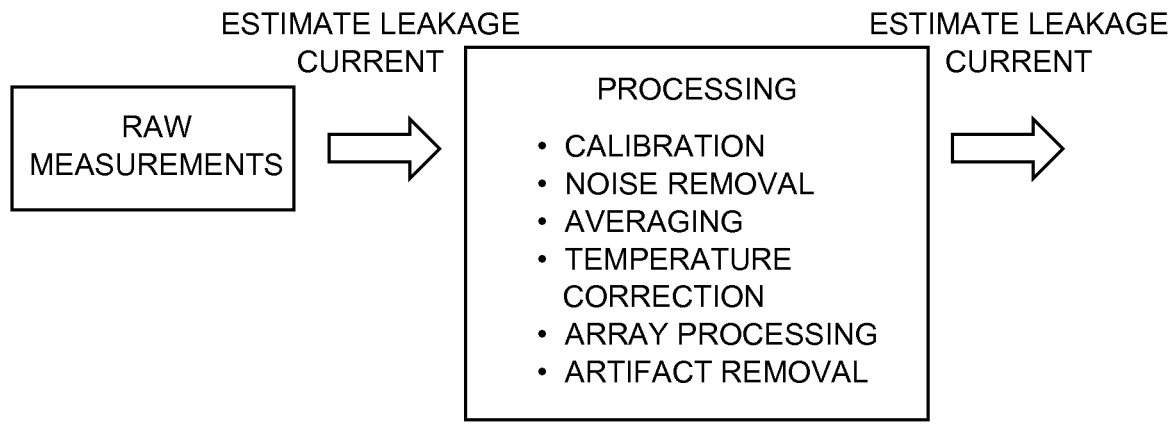
FIG. 10 is a block diagram showing illustrative processing options for measurements collected by an electrode-based tool.

FIG. 10 is a block diagram showing illustrative processing options for measurements collected by an electrode-based tool. In FIG. 10, raw measurements for an electrode-based tool are collected. As an example, the raw measurements may correspond to voltage measurements collected by voltage monitoring electrodes as one or more current electrodes inject current into a formation. The processing options for the raw measurements include, for example, calibration operations, noise removal operations, averaging operations, temperature correction operations, array processing operations, and artifact removal operations. Some of the operations that can be applied on the acquired raw responses are as follows: filtering to reduce noise; calibration to known calibration experiment; array processing (software focusing) of the data to achieve different depth of detection or vertical/azimuthal resolution. All of these operations above are well-known in the field of EM well logging and their details will not be provided here. The model-based leakage current estimates as described herein may be obtained before or after raw voltage measurements the above processing steps. To obtain model-based leakage current estimates at least some raw voltage measurements and an internal impedance database or model is used as described herein, where the internal impedance is selected or calculated as a function of temperature.

Other processing includes application of an inversion to the data gathered. Inversion schemes correspond to operations that are required to convert the measured responses to electromagnetic properties of a formation. A general picture of the inversion scheme is as follows: a forward model is used to generate the tool response. Then the measured response is compared to signals from the forward model and an iterative numerical optimization problem is solved based on the difference between the two. A numerical model of the formation is constructed for forward modeling. A number of constraints consistent with the a priori knowledge of the formation can be used to single out the correct physical solution. After convergence of the inversion the solution for electromagnetic properties of the formation can be obtained.

Figure 11:
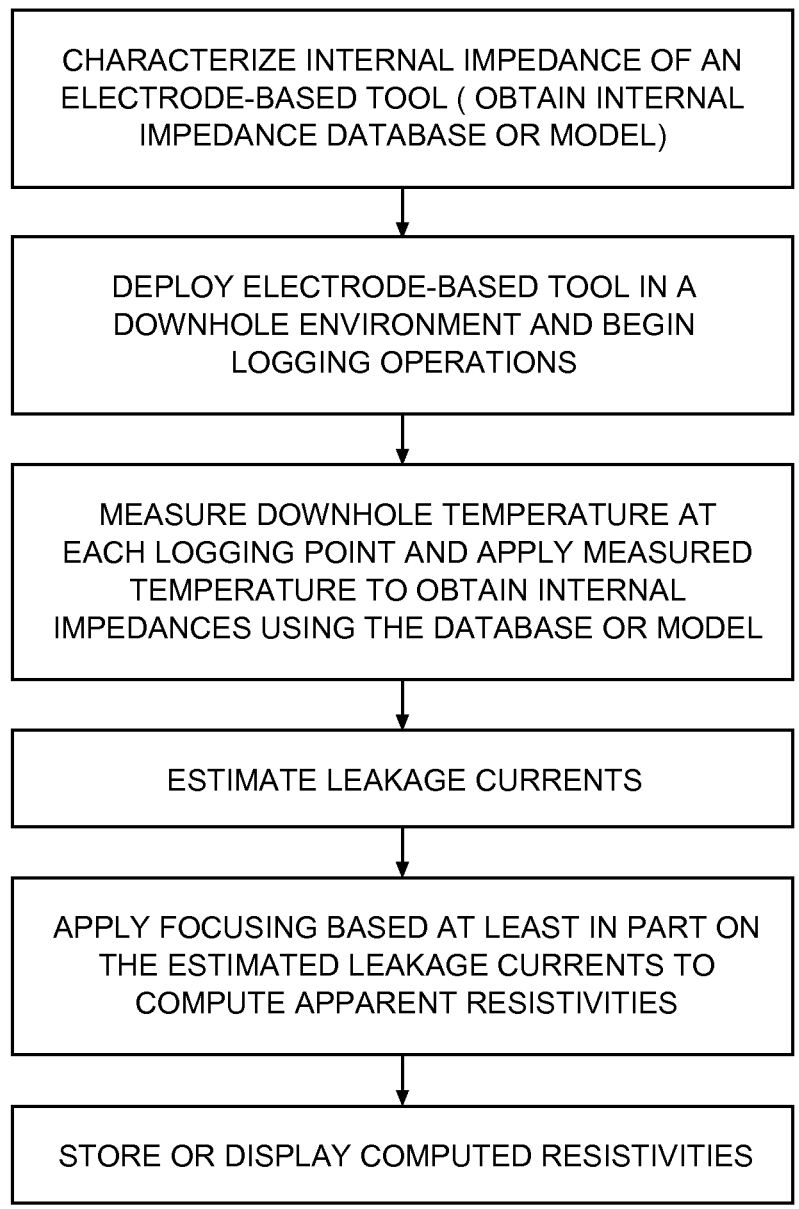
FIG. 11 is a flowchart showing an illustrative resistivity logging method employing an internal impedance database.

FIG. 11 is a flowchart showing an illustrative resistivity logging method employing an internal impedance database. First, the electrode-based tool is characterized on earth's surface by measuring the internal impedance between each electrode and the return at all frequencies of operation, and over the temperature range expected downhole. The characterization process provides, for example, an internal impedance database or model. The internal impedance between any electrode and the return is mainly the output impedance of the power amplifier used to supply current to that electrode. As an example, power amplifiers impedances can be measured using low noise, high precision impedance analyzer. In some embodiments, a thermal characterization can be performed by "baking" the amplifiers boards in controlled temperature ovens while making impedance measurements. This thermal characterization can be done in the factory and does not have to be repeated on-site. As desired, on-site impedance measurements (at one temperature point) can be performed to calibrate for any change in amplifier impedance from the previously obtained factory characterization. In an example calibration, the on-site measurement is compared with factory measurements for a given temperature. The comparison results in a scaling factor that can be applied to values in the internal impedance database and/or to values output from an internal impedance model.

After the internal impedance of the electrode-based tool is characterized, the electrode-based tool is deployed in a downhole environment and logging operations begin (note: the calibration to scale internal impedances may be performed before or after deployment). At each logging point downhole, temperature is measured and the corresponding set of internal impedances is calculated (e.g., by looking up values in an internal impedance database or by applying the temperature to an internal impedance model). Next, the leakage currents from non-active electrodes are estimated (e.g., using the model-based leakage current equations). In at least some embodiments, voltage measurements and internal impedances obtained from an internal impedance database or model are used to estimate the leakage currents. Next, focusing based at least in part on the estimated leakage currents is applied to compute apparent resistivities (e.g., see the equations for Modified Focused Modes 1-5). The computed resistivities are stored or displayed (e.g., in the form of a log). The methods described herein are valid for any impedance network that may be present in between electrodes of an electrode-based tool. Besides the array laterolog tool described herein, other tools that could benefit from internal impedance characterization and model-based leakage currents include, for example, dual laterolog tools, micro-resistivity logging tools, spherically focused logging tools, micro-spherically focused logging tools. Further, internal impedance characterization and model-based leakage currents may be applied to surface prospecting arrangements that employ electrodes to analyze surface-to-surface responses, surface-to-borehole responses, or borehole-to-borehole responses (e.g., cross-well properties).

Numerical Example

To demonstrate the accuracy of the proposed model-based leakage currents, consider an array laterolog tool, such as the one represented in FIGS. 4-6, operating in 8" diameter borehole filled with mud with resistivity $R_m$=0.1 Ω·m. FIG. 12 shows a table comparing the apparent resistivities of an ideal tool with infinite input impedances with the apparent resistivities of a real tool with input impedances of 10,000 Ω·m. Meanwhile FIG. 13 shows a table comparing the percentage error in apparent resistivities of a real tool relative to an ideal tool. For the example results given in the tables of FIGS. 12 and 13, the input impedance is assumed to constant for all electrodes and over all frequencies of operation for simplicity. Two formation resistivities of 1000 Ω·m and 10,000 Ω·m. are considered.

For the sake of comparison, real tool results are obtained using three different methods:
1) Measuring only injected currents from active electrodes and neglecting (setting to zero) leakage currents at non-active electrodes. This is equivalent to treating the real tool as if it were ideal.
2) Measuring all currents at active and non-active electrodes and processing them according to the Modified Focused Modes 1-5 described herein.
3) Measuring injected currents from active electrodes and internal impedances and estimating leakage currents according to the model-based leakage current equations described herein.

Results show the following:
Neglecting leakage current in real tools results in significant errors in apparent resistivity that increase with increasing the ratio between formation (and mud) resistivity and the tool internal impedance.
Measuring all currents in active and non-active electrodes completely resolves the impedance issue, as expected.
The proposed method for estimating leakage currents from internal impedance characterization produces results that are very close to the ideal tool results (error below 0.5%) even with high formation resistivity.

Figure 14:
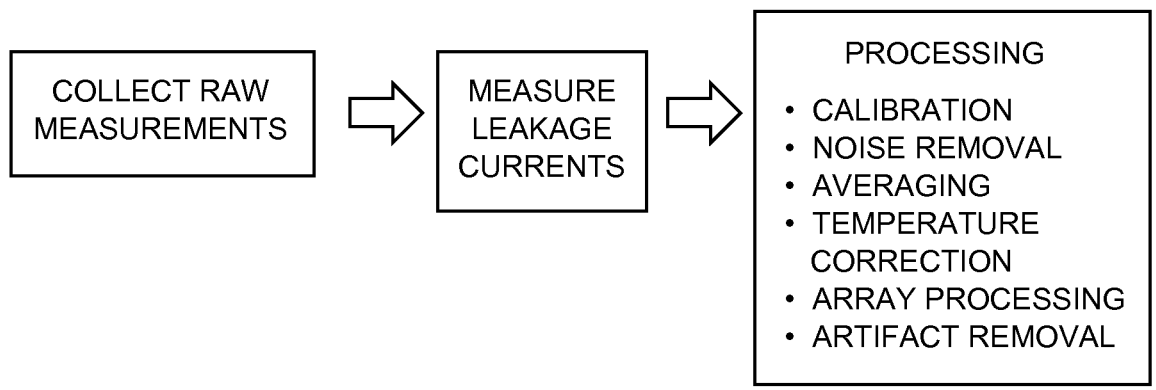
FIG. 14 is a block diagram showing illustrative processing options for measurements collected by an electrode-based tool.

FIG. 14 is a block diagram showing illustrative processing options for measurements collected by an electrode-based tool. In FIG. 14, raw measurements for an electrode-based tool are collected. As an example, the raw measurements may correspond to voltage measurements collected by voltage monitoring electrodes as one or more current electrodes inject current into a formation. As the raw measurements are collected, corresponding leakage current measurements are also collected as described herein. The processing options for the raw measurements include, for example, calibration operations, noise removal operations, averaging operations, temperature correction operations, array processing operations, and artifact removal operations. Some of the operations that can be applied on the acquired raw responses are as follows: filtering to reduce noise; calibration to known calibration experiment; array processing (software focusing) of the data to achieve different depth of detection or vertical/azimuthal resolution. All of these operations above are well-known in the field of EM well logging and their details will not be provided here.

Other processing includes application of an inversion to the data gathered. Inversion schemes correspond to operations that are required to convert the measured responses to electromagnetic properties of a formation. A general picture of the inversion scheme is as follows: a forward model is used to generate the tool response. Then the measured response is compared to signals from the forward model and an iterative numerical optimization problem is solved based on the difference between the two. A numerical model of the formation is constructed for forward modeling. A number of constraints consistent with the a priori knowledge of the formation can be used to single out the correct physical solution. After convergence of the inversion the solution for electromagnetic properties of the formation can be obtained.

Figure 15:
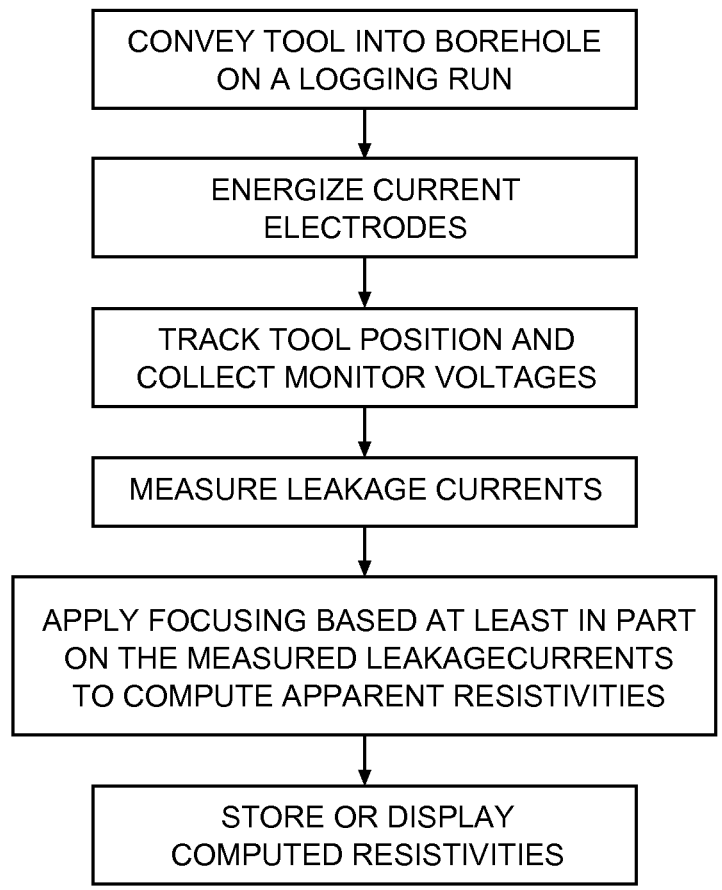
FIG. 15 is a flowchart showing an illustrative resistivity logging method employing a measured leakage current.

FIG. 15 is a flowchart showing an illustrative resistivity logging method employing measured leakage currents. First, an electrode-based tool is conveyed into a borehole on a logging run. At each logging point downhole at least one current electrode is energized. For each logging point, tool position is tracked and voltages are collected by the voltage monitoring electrodes. Further, main currents and leakage currents are measured for each logging point. The voltages collected by the monitor voltage electrodes and the measured currents are stored and/or communicated to earth's surface. Next, focusing based at least in part on the measured leakage currents is applied to compute apparent resistivities (e.g., see the equations for Modified Focused Modes 1-5). The computed resistivities are stored or displayed (e.g., in the form of a log).

Measuring and using leakage currents as described herein is valid for any impedance network that may be present in between electrodes of an electrode-based tool. Besides the array laterolog tool described herein, other tools that could benefit from measured leakage currents include, for example, dual laterolog tools, micro-resistivity logging tools, spherically focused logging tools, micro-spherically focused logging tools. Further, measured leakage currents may be applied to surface prospecting arrangements that employ electrodes to analyze surface-to-surface responses, surface-to-borehole responses, or borehole-to-borehole responses (e.g., cross-well applications).

Array laterolog tools that use sensitive monitor electrodes can be difficult to design. Solutions include efforts to reduce electrical coupling and system noise. In some cases, designs are altered to increase the measured voltages, which can decrease the available signal-to-noise ratio.

As is known to those of ordinary skill in the art, some schemes have been developed to correct for measurement errors under these conditions. Among them are what is known to those of ordinary skill in the art as small signal algorithm (SSA) corrections, which take advantage of the relationships that exist between voltages at different monitor electrodes and voltage differences between different monitor electrode pairs when the formation resistivity is much larger than the mud resistivity. Using SSA techniques, these relationships can be exploited to replace small signal measurements with algebraic combinations of larger measurements, which are less susceptible to errors. Those that desire additional information about such techniques can refer to the literature, including for example, International Patent Publication Number WO/2015/023271, entitled "Improved Array Laterolog Tool Techniques".

For the relationships to work well with SSA techniques, it is assumed that voltage measurements are made with infinite input impedance, and that inactive (i.e., non-injecting) current electrodes do not receive any incoming current—that the impedance between inactive current electrodes and the current return is infinite. This measurement state is referred to as making measurements with the "ideal tool".

In practice, the input impedance of the voltage electrodes and the inactive current electrodes, which ideally should be high enough to negate this effect on the measurements, may actually be low enough to causing non-negligible currents to leak into those electrodes. Methods to correct for such leakage currents are discussed above. These methods, however, are still vulnerable to environmental errors that affect small differential voltages. Applying the SSA to replace those small measurements in the presence of leakage currents introduces shifts in voltage levels that can produce very large errors in apparent resistivity after focusing.

To address some of these challenges, as well as others, apparatus, systems, and methods are described herein that improve resistivity measurement accuracy in an invaded formation. This is accomplished using a method for accurate processing of array laterolog measurements in high resistivity formations where the SNR of differential measurements is low and the effect of leakage current through internal tool impedances is more pronounced. The methods to be described herein include, in various embodiments, the features of:

Adjusting SSA results to reduce or eliminate offsets introduced by current leakage through tool impedances;
An adaptive averaging filter to improve the SNR;
Limiting apparent resistivities to a prescribed maximum;
Constraining apparent resistivities in high resistivity zones to avoid nonphysical invasions in the inversion results.

In short, the benefits that accrue when the disclosed technical solution is implemented may include improving the accuracy and operational range of array laterolog tools. In this way, a particular laterolog tool can be made useful over a larger set of formation and borehole conditions.

Overview of Array Laterolog Tools

Array laterolog tools are employed to determine the electrical properties of a formation at different depths of investigation, which may be obtained by operating the tool using different excitation modes and applying a focusing algorithm to the measured data. These electrical properties may include resistivity measurements.

Figure 16:
FIG. 16 is a block diagram of a laterolog array tool that can be operated in accordance with various embodiments of the invention.

FIG. 16 is a block diagram of a laterolog array tool 1600 that can be operated in accordance with various embodiments of the invention. Here, the survey electrode is denoted by the label $A_0$. There are a total of 2N guard electrodes ($A_1$, $A_1'$, ..., $A_N$, $A_N'$) and 4N−4 monitor electrodes ($M_1$, $M_1'$, $M_2$, $M_2'$, ..., $M_{2(N-1)}$, $M_{2(N-1)}'$). Array laterolog tools are generally operated such that voltages at (or voltage differences between) monitor electrodes are measured as a function of the current emitted from different combinations of guard electrodes. As an example, the tool 1600 may provide the following N excitation modes:

Excitation Mode 1: $I_{A_0} = 1$ Amperes;  Equation (1)

$$I_{Ai} + I'_{Ai} = 0, i = 1, ..., N-1$$

Excitation Mode 2: $I_{A_1} + I'_{A_1} = 1$ Amperes;

$$I_{A_0} = 0; I_{Ai} + I'_{Ai} = 0, i = 2, ..., N-1$$

-continued

Excitation Mode N: $I_{A_{N-1}} + I'_{A_{N-1}} = 1$ Amperes;

$$I_{A_0} = 0; I_{Ai} + I'_{Ai} = 0, i = 1, ..., N-2$$

where $I_{Ai}$ denotes the current emitted from electrode $A_1$. In each of these excitation modes, currents are returned to current electrodes $A_N$ and $A_N'$.

Focusing algorithms use the principle of superposition in order to combine measurements from different excitation modes, providing a result that is equivalent to forcing the current emitted from the survey electrode to travel in a narrow path close to the survey electrode. This is accomplished by setting the potential difference between monitor electrode pairs to zero, preventing the flow of current in that direction. Furthermore, emitted current may be directed to return to different guard electrodes at different distances with respect to the survey electrode. Since the depth of investigation is proportional to the separation between the electrode emitting current and the return electrode, different linear combinations of excitation modes can be employed to make measurements at different depths of investigation.

Software focusing is described herein, although some embodiments utilize hardware focusing, or a combination of hardware and software focusing. Those of ordinary skill in the art are familiar with these techniques. Others are encouraged to consult the literature, including for example, United States Patent Publication Number US 20130234718, entitled "Multi-Array Laterolog Tools and Methods with Differential Voltage Measurements".

It should be noted that while a laterolog array is used in the various examples that follow, this is done as a matter of convenience, and the various embodiments are not to be so limited. Thus, the methods described herein can be applied to radial 1D inversions of measurements made by a variety of tools, including array induction tools, among others.

Figure 17:
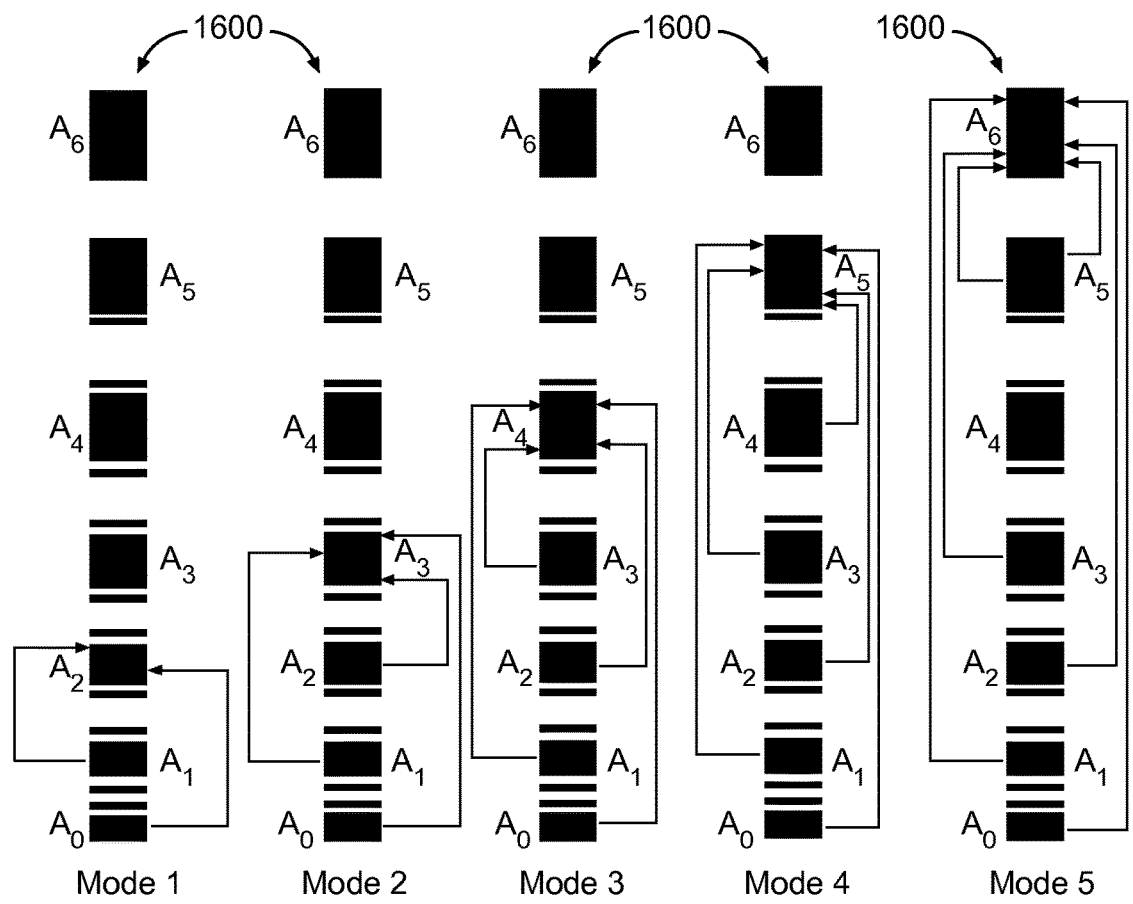
FIG. 17 illustrates operational modes of the laterolog array tool shown in FIG. 16.

FIG. 17 illustrates operational modes of the laterolog array tool shown in FIG. 16. The operational modes obtained as a result of focusing the elements of the array 1600 are depicted in the figure, where only one half of the laterolog tool is shown for simplicity. That is, the primed electrodes are not shown in FIG. 17.

It is also noted that the tool 100 depicted in FIG. 17 is a special case of the tool 1600 shown in FIG. 16, with N=6. Going forward, this specific configuration (i.e., N=6) will be used to provide examples of use for various method embodiments, and the operational modes 1 to 5 (i.e., N−1) for the tool 1600 will now be described.

In Mode 1, currents from $A_0$, $A_1$, and $A_1'$ return to $A_2$ and $A_2'$. To accomplish focusing in this mode, the voltage difference of $(VM_1+VM_1')-(VM_2+VM_2')$ is set to 0.

In Mode 2, currents from $A_0$, $A_1$, $A_1'$, $A_2$, and $A_2'$ return to $A_3$ and $A_3'$. To accomplish focusing in this mode, the voltage differences of $(VM_1+VM_1')-(VM_2+VM_2')$ and $(VM_3+VM_3')-(VM_4+VM_4')$ are set to 0.

In Mode 3, currents from $A_0$, $A_1$, $A_1'$, $A_2$, $A_2'$, $A_3$, and $A_3'$ return to $A_4$ and $A_4'$. To accomplish focusing in this mode, the voltage differences of $(VM_1+VM_1')-(VM_2+VM_2')$, $(VM_3+VM_3')-(VM_4+VM_4')$ and $(VM_5+VM_5')-(VM_6+VM_6')$ are set to 0.

In Mode 4, currents from $A_0$, $A_1$, $A_1'$, $A_2$, $A_2'$, $A_3$, $A_3'$, $A_4$, and $A_4'$ return to $A_5$ and $A_5'$. To accomplish focusing in this mode, the voltage differences of $(VM_1+VM_1')-(VM_2+VM_2')$, $(VM_3+VM_3')-(VM_4+VM_4')$, $(VM_5+VM_5')-(VM_6+VM_6')$ and $(VM_7+VM_7')-(VM_8+VM_8')$ are set to 0.

In Mode 5, currents from $A_0$, $A_1$, $A_1'$, $A_2$, $A_2'$, $A_3$, $A_3'$, $A_4$, $A_4'$, $A_5$, and $A_5'$ return to $A_6$ and $A_6'$. To accomplish focusing in this mode, the voltage differences of $(VM_1+VM_1')-(VM_2+VM_2')$, $(VM_3+VM_3')-(VM_4+VM_4')$, $(VM_5+VM_5')-(VM_6+VM_6')$, $(VM_7+VM_7')-(VM_8+VM_8')$ and $(VM_9+VM_9')-(VM_{10}+VM_{10}')$ are set to 0.

Thus, as the mode number increases, emitted currents arrive at return electrodes that are further away from the source, providing a deeper investigation of the formation.

Measurements in Highly Resistive Formations

Figure 18:
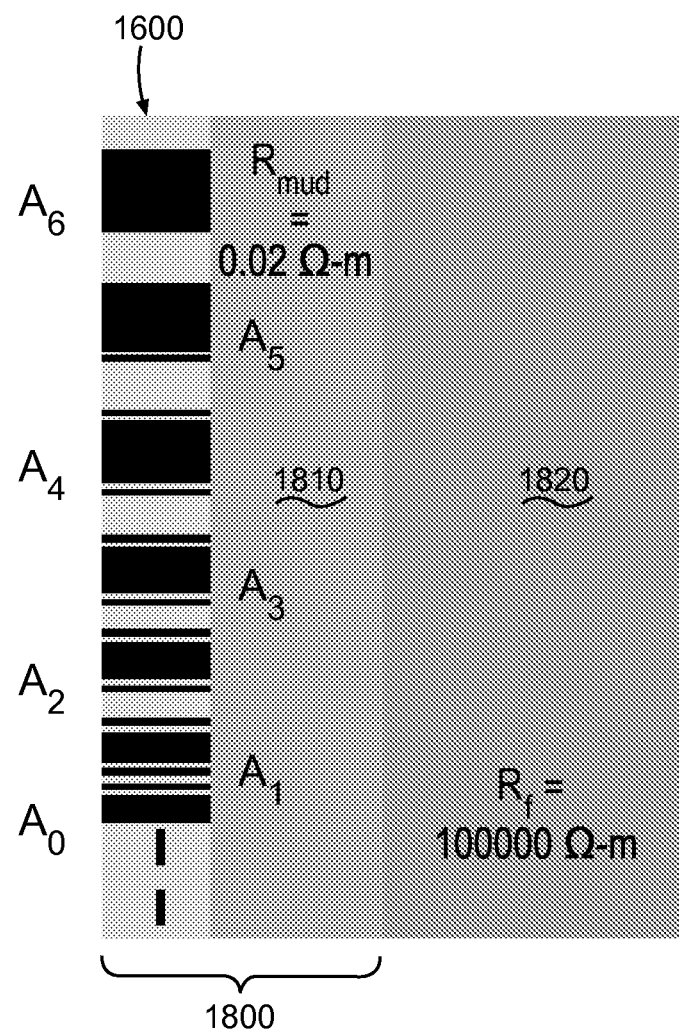
FIG. 18 is a side, cut-away view of a laterolog tool in a borehole, surrounded by highly conductive mud and a highly resistive formation, according to various embodiments of the invention.

FIG. 18 is a side, cut-away view of a laterolog tool 1600 in a borehole 1800, surrounded by highly conductive mud 1810 and a highly resistive formation 1820, according to various embodiments of the invention. The borehole and formation geometry shown in the figure will be used to illustrate the aforementioned problem of high sensitivity array Laterolog monitor electrode pairs in the presence of high formation resistivity. Here an array laterolog tool 1600 with generic dimensions is located in a conductive borehole 1800 with a radius of four inches and a mud resistivity of 0.02 Ω-m. The formation resistivity is 100,000 Ω-m.

This case can be simulated using a finite element-based code to obtain the voltages which should be present at each monitor electrode for each excitation mode, as described in the previous section. Table 1 lists the voltage differences at different monitor pairs (e.g. VM1,M2 denotes the voltage difference between monitor electrodes $M_1$ and $M_2$.) for an ideal tool with infinite amplifier impedance.

TABLE 1

Differential voltages at monitor electrode pairs for different excitation modes for an ideal tool with infinite amplifier impedance

| | VM1, M2 | VM3, M4 | VM5, M6 | VM7, M8 | VM9, M10 |
|---|---|---|---|---|---|
| E1 | 0.0293 | 0.02941 | 0.069001 | 0.108576 | 0.157841 |
| E2 | −5.40E−06 | 0.029431 | 0.069001 | 0.108576 | 0.157841 |
| E3 | −1.16E−07 | −5.30E−06 | 0.069005 | 0.108576 | 0.157842 |
| E4 | −9.45E−08 | −3.48E−07 | 2.72E−07 | 0.108575 | 0.157842 |
| E5 | −7.10E−08 | −2.61E−07 | −1.16E−06 | −2.95E−06 | 0.157844 |
| E6 | −4.39E−08 | −1.61E−07 | −7.16E−07 | −1.87E−06 | −4.59E−06 |

It can be seen that voltage differences might be very small, especially when the monitor electrode pair is not on a dominant current return path. In this case, the lowest voltage difference occurs for excitation mode E6 with respect to VM1,M2.

Those of ordinary skill in the art know that the overall accuracy and operational range of the array Laterolog tool depends on the accurate measurement of these small voltages. Even a small amount of error, on the order of 100 nV, may cause a large percentage of error in the measurement of voltages. It has been observed (although not shown here) that the relative error between electrode pairs can also produce large errors in the apparent resistivities that are determined after hardware and/or software focusing has been employed.

As is known to those of ordinary skill in the art, the SSA uses fixed relationships (ratios) between voltage differences across different monitor electrode pairs. To understand the reasoning behind this method, consider the information contained in Tables 2 and 3:

TABLE 2

Differential measurement ratio of different excitation modes for an ideal tool with infinite amplifier impedance

| | VM1,M2 | VM3,M4 | VM5,M6 | VM7,M8 | VM9,M10 |
|---|---|---|---|---|---|
| E1/E2 | −5.43E+03 | 9.99E−01 | 1.00E+00 | 1.00E+00 | 1.00E+00 |
| E2/E3 | 4.66E+01 | −5.55E+03 | 1.00E+00 | 1.00E+00 | 1.00E+00 |
| E3/E4 | 1.22E+00 | 1.52E+01 | 2.54E+05 | 1.00E+00 | 1.00E+00 |
| E4/E5 | 1.33E+00 | 1.33E+00 | −2.34E−01 | −3.69E+04 | 1.00E+00 |
| E5/E6 | 1.62E+00 | 1.62E+00 | 1.62E+00 | 1.58E+00 | −3.44E+04 |

TABLE 3

Differential measurements ratio of different pairs for an ideal tool with infinite amplifier impedance

| | VM1,M2/VM3,M4 | VM3,M4/VM5/M6 | VM5,M6/VM7,M8 | VM7,M8/VM9,M10 |
|---|---|---|---|---|
| E1 | 0.996269327 | 0.426229697 | 0.63550277 | 0.687881994 |
| E2 | −0.000183357 | 0.426536936 | 0.635502828 | 0.687882035 |
| E3 | 0.02181256 | −7.68614E−05 | 0.635543217 | 0.687882162 |
| E4 | 0.271641701 | −1.27823448 | 2.50684E−06 | 0.687871032 |
| E5 | 0.272101736 | 0.224588339 | 0.394169246 | −1.86638E−05 |
| E6 | 0.272290854 | 0.225087643 | 0.382760615 | 0.407552228 |

In Table 2, the ratio of the voltage differences between different excitation modes for the same monitor electrode pair is shown. Each entry in Table 2 represents a ratio between the corresponding entry in Table 1, to the entry directly below that value in Table 1.

Similarly, in Table 3, the ratio of different monitor electrode pairs for the same excitation mode is provided. In this case, each entry in Table 3 is the ratio of the corresponding entry in Table 1, to the entry in the column directly to the right of that value in Table 1.

Inspecting Table 2, it can be seen that ratios between the $4^{th}$ and $5^{th}$ excitation modes are very similar for monitor electrode pairs $M_1$-$M_2$ and $M_3$-$M_4$. Similarly, the ratios between the $5^{th}$ and $6^{th}$ excitation modes are very similar for monitor electrode pairs $M_1$-$M_2$, $M_3$-$M_4$ and $M_5$, $M_6$.

In Table 3, the ratio of VM1,M2/VM3,M4 is very similar for the $4^{th}$, $5^{th}$, and $6^{th}$ excitation modes. Similarly, the ratio of VM3,M4/VM5,M6 is very similar for the $5^{th}$ and $6^{th}$ excitation modes. It is noted that these relationships arise from the physics specific to a high formation resistivity case, and may only be valid in such conditions.

These relationships have been exploited in the SSA to replace monitor electrode pair voltage differences having the highest error sensitivity with those having a lower error sensitivity.

For example, in this case, one might make the following replacements:

$$VM1, M2\ (E5) \approx \frac{VM1, M2\ (E4) \times VM3, M4\ (E5)}{VM3, M4\ (E4)}$$ Equation (2)

$$VM3, M4\ (E6) \approx \frac{VM3, M4\ (E5) \times VM5, M6\ (E6)}{VM5, M6\ (E6)}$$

$$VM1, M2\ (E6) \approx$$

$$\frac{VM1, M2\ (E4) \times VM3, M4\ (E5) \times VM5, M6\ (E6)}{VM3, M4\ (E4) \times VM5, M6\ (E6)}$$

where VMi,Mj(Ek) denotes the voltage difference between monitor electrodes i and j at excitation mode k.

Now, the reader is asked to consider a real tool, with finite measurement impedance, such as a tool having an input impedance on the order of 10 kOhm between each of the excitation electrodes A1, A2, . . . , A5 and the current return electrode A6. Similar results for a real tool are shown in Tables 4 through 6. It is observed from Table 4 that the lowest voltage difference, that of excitation mode 6 for VM1,M2, has increased by a factor of 20 because of current leakage through the finite internal impedance between A0 and A6. Nevertheless, values of some differential voltages still remain too low for providing precise measurements.

TABLE 4

Differential voltages at monitor electrode pairs for different excitation modes for a real tool with finite amplifier impedance

| | VM1, M2 | VM3, M4 | VM5, M6 | VM7, M8 | VM9, M10 |
|---|---|---|---|---|---|
| E1 | 0.029296 | 0.029402 | 0.068972 | 0.108518 | 0.157743 |
| E2 | −7.95E−06 | 0.029426 | 0.068981 | 0.108537 | 0.157775 |
| E3 | −3.57E−06 | −1.27E−05 | 0.068979 | 0.108522 | 0.157749 |
| E4 | −2.17E−06 | −4.84E−06 | −1.55E−05 | 0.108541 | 0.157782 |
| E5 | −1.62E−06 | −3.68E−06 | −1.31E−05 | −2.89E−05 | 0.157796 |
| E6 | −1.06E−06 | −2.42E−06 | −8.54E−06 | −1.89E−05 | −3.56E−05 |

TABLE 5

Differential measurement ratio of different excitation modes for a real tool with finite amplifier impedance

| | VM1,M2 | VM3,M4 | VM5,M6 | VM7,M8 | VM9,M10 |
|---|---|---|---|---|---|
| E1/E2 | −3.68E+03 | 9.99E−01 | 1.00E+00 | 1.00E+00 | 1.00E+00 |
| E2/E3 | 2.23E+00 | −2.32E+03 | 1.00E+00 | 1.00E+00 | 1.00E+00 |
| E3/E4 | 1.65E+00 | 2.62E+00 | −4.44E+03 | 1.00E+00 | 1.00E+00 |
| E4/E5 | 1.34E+00 | 1.32E+00 | 1.18E+00 | −3.76E+03 | 1.00E+00 |
| E5/E6 | 1.53E+00 | 1.52E+00 | 1.54E+00 | 1.53E+00 | −4.43E+03 |

TABLE 6

Differential measurements ratio of different pairs for a real tool with finite amplifier impedance

| | VM1,M2/VM3,M4 | VM3,M4/VM5,M6 | VM5,M6/VM7,M8 | VM7,M8/VM9,M10 |
|---|---|---|---|---|
| E1 | 0.996413604 | 0.426283596 | 0.635580577 | 0.687942871 |
| E2 | −0.000270185 | 0.426572811 | 0.635556851 | 0.68792478 |
| E3 | 0.281803196 | −0.000183623 | 0.635621044 | 0.68794304 |
| E4 | 0.448633711 | 0.311124102 | −0.000143207 | 0.68791416 |
| E5 | 0.441248614 | 0.279859445 | 0.455036424 | −0.000182908 |
| E6 | 0.439108031 | 0.283337352 | 0.452834088 | 0.529634478 |

From Table 5 and 6, it is observed that the relationships between respective differential measurements show some differences compared with the ideal tool case. Inspecting Table 5, it can be seen that ratios between the $4^{th}$ and $5^{th}$ excitation modes for monitor electrode pairs $M_1$-$M_2$ and $M_3$-$M_4$ are within 1.5% of each other. The ratios between the $5^{th}$ and $6^{th}$ excitation modes for monitor electrode pairs $M_1$-$M_2$, $M_3$-$M_4$ and $M_5$, $M_6$ are within 1.3% of each other.

Inspecting Table 6, it can be seen that the ratios VM1,M2/VM3,M4 for the $4^{th}$, $5^{th}$, and $6^{th}$ excitation modes are within 2% of each other. And the ratios VM3,M4/VM5,M6 for the $5^{th}$ and $6^{th}$ excitation modes are within 1.2% of each other.

Even though these errors may seem small, after focusing is applied, they can result in large errors in apparent resistivity (Ra). This can be seen in Table 7, which summarizes apparent resistivities for ideal and real tools with and without application of the SSA.

TABLE 7

Apparent resistivity obtained using software focusing of measurements done using an ideal and a real tool. Percentage error is calculated with respect to "Ideal tool: No SSA".

|  | Ideal tool: No SSA | Ideal tool: SSA | Real tool: No SSA | Real tool: SSA | Real tool: SSA, SSA fix |
| --- | --- | --- | --- | --- | --- |
| Ra1 | 348.3590156 | 348.3590156 | 348.3589959 | 348.3630326 | 348.3589959 |
| Ra2 | 93295.33232 | 95948.98459 | 93295.11927 | −2275.777055 | 93294.48257 |
| Ra3 | 95219.81023 | 94132.33484 | 95221.10561 | 10248.7239 | 95218.68943 |
| Ra4 | 93938.33192 | 93051.12155 | 93934.97542 | 8753.898013 | 93937.14717 |
| Ra5 | 88827.53325 | 88666.38739 | 88828.8597 | 7619.060004 | 88829.10627 |
| % Error Ra1 |  | 0 | 5.64862E−06 | 0.001153121 | 5.64924E−06 |
| % Error Ra2 |  | 2.844356944 | 0.000228361 | 102.4393257 | 0.000910826 |
| % Error Ra3 |  | 1.142068432 | 0.001360407 | 89.23677345 | 0.001177071 |
| % Error Ra4 |  | 0.944460422 | 0.003573094 | 90.68122902 | 0.000126121 |
| % Error Ra 5 |  | 0.181414313 | 0.00149329 | 91.42263696 | 0.00177087 |

It can be noted that for an ideal tool, application of the SSA introduced a relatively small error (below 3%). However for a real tool, use of the SSA can significantly alter the results, with errors on the order of 90% and greater. Note that real tool, full current focusing, as described above, is used to correct for leakage currents.

Thus, in various embodiments, the corrected results obtained using the SSA are adjusted to accommodate the realities of using real tools in high resistivity formations. The last column in Table 7 (Real tool: SSA, SSA fix) shows the results that can be obtained after applying an adjustment, or "fix" to the SSA results. This adjustment, which is part of most embodiments described herein, provides dramatically improved results in the operation of the array laterolog tool.

Example Methods

Figure 19:
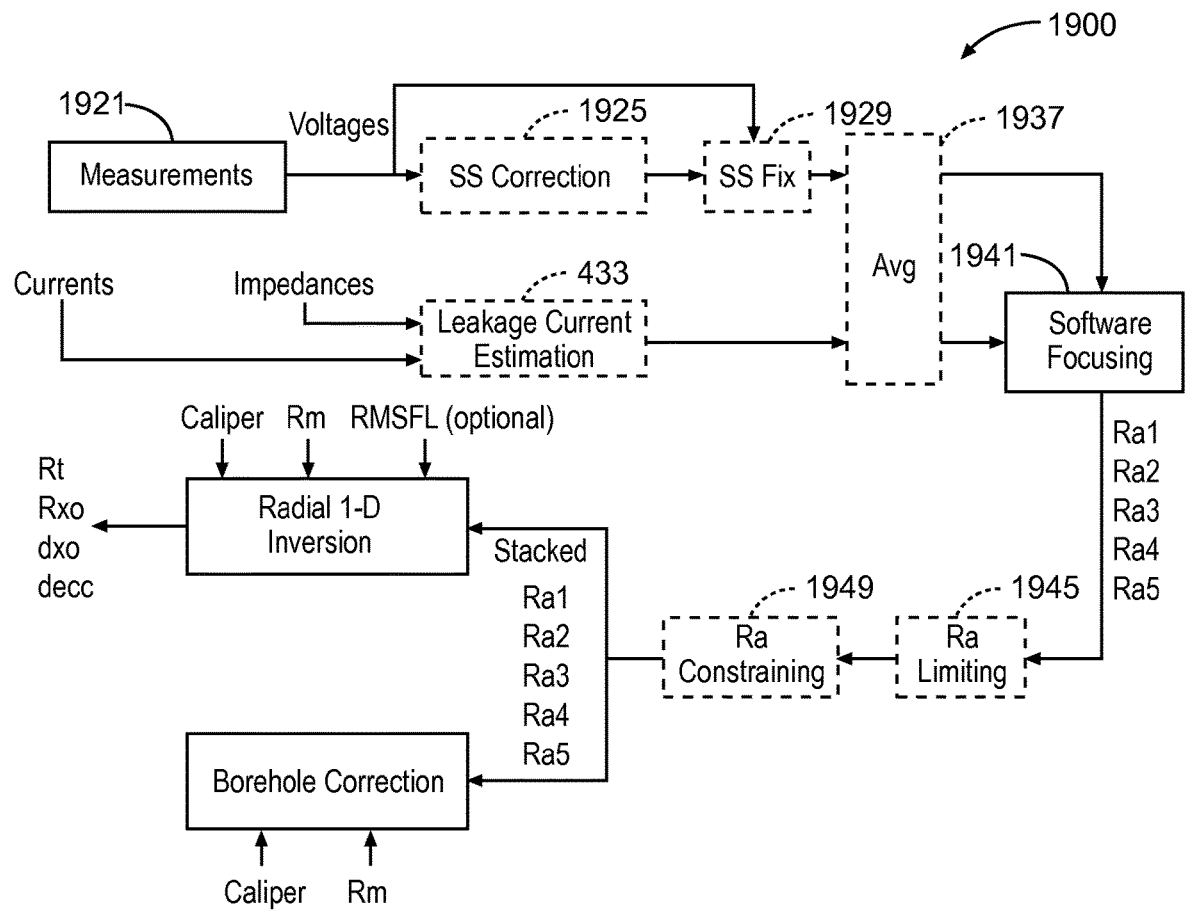
FIG. 19 is a flow diagram illustrating several methods of data correction and inversion, according to various embodiments of the invention.

FIG. 19 is a flow diagram illustrating several methods 1900 of data correction and inversion, according to various embodiments of the invention. In the figure, a schematic of ALAT data processing is shown. At block 1921, the ALAT tool measures a set of voltages and currents from the monitor and current electrodes of the tool, respectively. At block 1921, tool internal impedances are also measured using appropriate instruments.

At blocks 1925, 1929, 1945, and 1949, corrections may be applied to the measured data to improve accuracy and reduce noise. These are shown as small signal (SS) correction at block 1925, SS fix (adjustment) at block 1929, impedance correction (via leakage current estimation) at block 1933, averaging at block 1937, apparent resistivity (Ra) limiting at block 1945, and Ra constraining at block 1949.

Not all of the correction activities are performed in all cases. Some of these activities may be turned on or off in various embodiments. Thus, they are shown as boxes with dashed lines to emphasize their provisional nature.

After correction has been applied (e.g., after the activities in blocks 1925, 1929, 1937, 1945, and 1949 occur), five apparent resistivities (Ra1 ... Ra5) together with caliper and mud resistivity data may be used to produce borehole-corrected apparent resistivities as well as radial one-dimensional (1D) inversion products; namely the inverted formation resistivity (Rt), invasion resistivity (Rxo), invasion radius (dxo), and tool eccentric standoff distance (decc).

In some embodiments, the invasion resistivity is set to equal the micro-spherically focused log (MSFL) resistivity as part of the inversion process, which may improve the other inversion results when MSFL resistivity turns out to be a close approximation of Rxo. The correction activities will be discussed in detail in the following paragraphs.

The SSA applied at block 1925 operates to approximate weak differential measurements with combinations of stronger measurements, based on fixed relationships between the measurements in high resistivity formations. The number of differential measurements replaced by the SSA is based on the strength of the input voltages with respect to a preset threshold.

To correct for leakage current through finite excitation electrode impedance at block 1933, currents in all of the excitation electrodes (whether they are active or inactive) are measured and used to apply software focusing techniques. This process is known as full current measurement to those of ordinary skill in the art. If the full current measurement process is not available, currents leaking into inactive excitation electrodes can be estimated from voltage measurements obtained at nearby monitor electrodes and the characterization of tool impedances. This process is described above.

Figure 20:
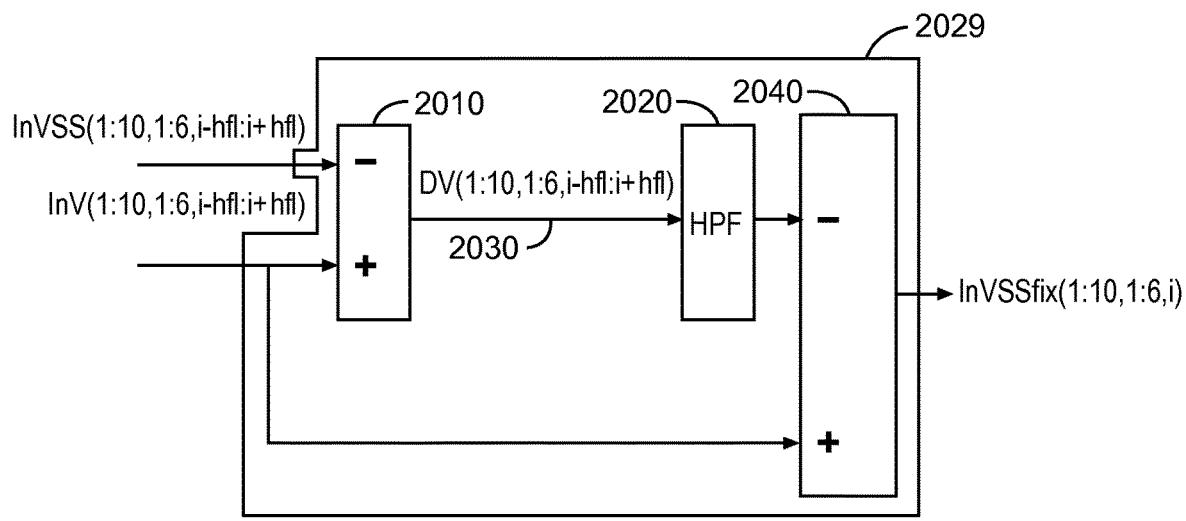
FIG. 20 is a flow diagram illustrating data adjustment activity, according to various embodiments of the invention.

FIG. 20 is a flow diagram illustrating data adjustment activity 1929, according to various embodiments of the invention. Here, the results of SSA application are adjusted to remove level shifts in the tool measurements that are introduced at high formation resistivity due to finite tool impedance.

To adjust the SSA result obtained at logging point i, block 1929 operates to takes as input an array of raw voltages measured at all of the monitor electrodes, over all of the excitation frequencies (i.e., modes), and over 2hfl+1 consecutive logging points centered at point i. This array is denoted by lnV(1:10, 1:6,i-hfl:i+hfl), for a tool with ten monitor electrodes and six modes, where hfl denotes "half filter length". In addition, the adjustment activity at block 1929 takes an array of the same raw voltages that were used as input to the SSA. This array is denoted by lnVSS(1:10, 1:6,i-hfl:i+hfl).

A difference between the two input arrays is obtained, perhaps via subtraction at the differencing element 2010, and then a high pass filter (HPF) 2020 is applied to pass high frequency components of the differential signal 2030. These high frequency components represent the noise in the raw input measurements lnV. The final action is to subtract the noise, picked up by the HPF, from the raw signal, using the differencing element 2040.

Signals processed using SSA (e.g., lnVSS) preserve the same boundary information as the raw signal (e.g., lnV) as long as the boundary transition is not abrupt. Therefore, by implementing the HPF 2020 on the differential signal DV, rather than on the raw signal lnV, boundary information (and hence vertical resolution) in the final, adjusted signal lnVSS-fix is preserved. The processing shown for block 1929 is therefore not very sensitive to the size and shape of the HPF.

Figure 21:
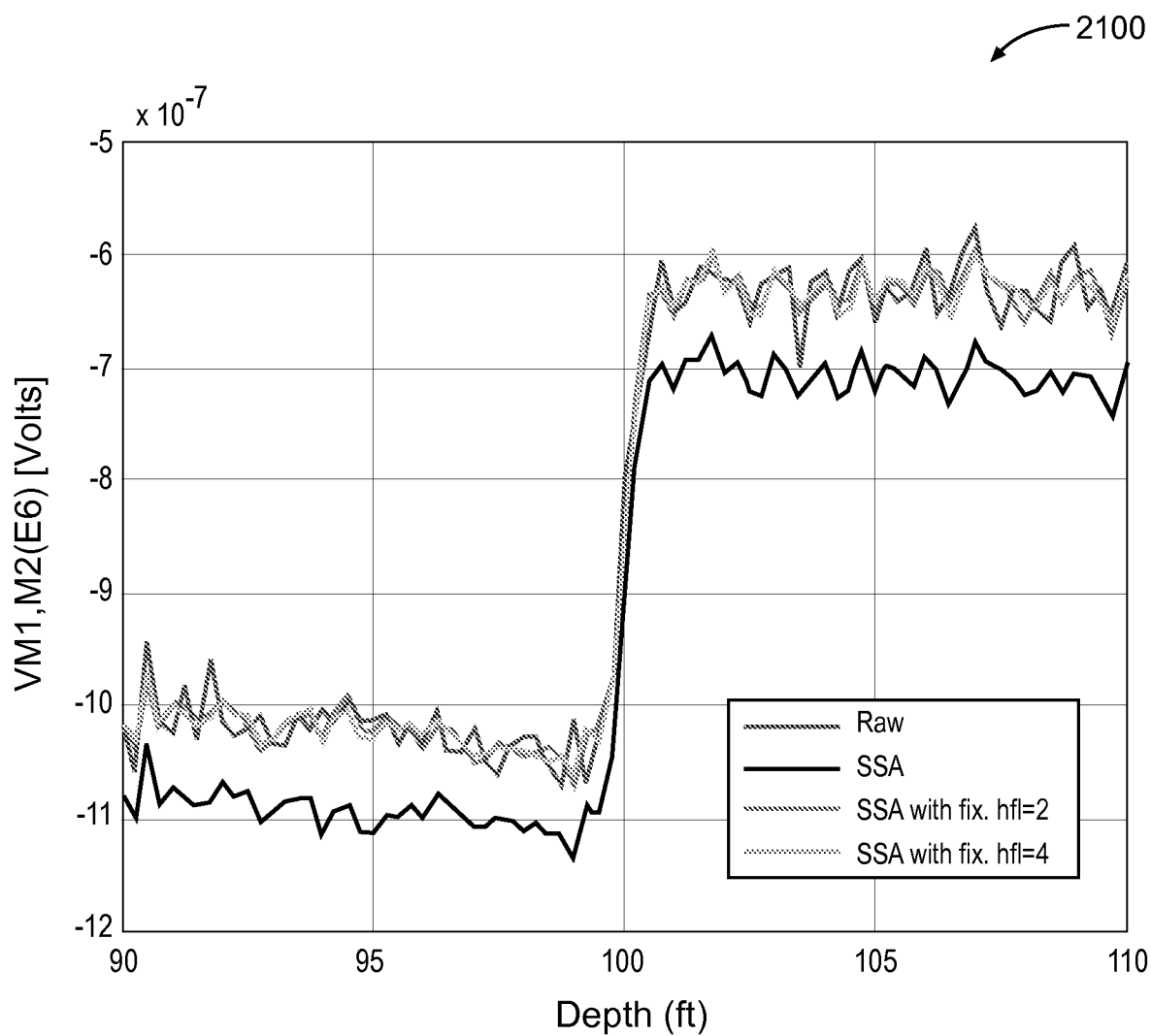
FIG. 21 is a graph illustrating the application of the methods shown in FIG. 20.

FIG. 21 is a graph 2100 illustrating the application of the methods shown in FIG. 20. Here the SSA adjustment process shown in block 1929 of FIG. 20 is applied at a bed boundary in a formation. In this example, the borehole radius=4 inches and Rm=0.02 ohm-m. Here, the values of Rt transition from about 1000 ohm-m to about 2000 ohm-m. Two implementations of the adjustment activity (shown as SSA with fix, hfl=2 and SSA with fix, HFL=4) shown for VM1,M2(E6), illustrate that noise in the raw signal (Raw) is reduced when the SSA results (SSA) is processed, without introducing level shifts and without sacrificing vertical resolution.

In some embodiments, where there the SNR is less than desired, an adaptive averaging filter can be used in addition to the SSA. This activity is shown in block bock 1937 of FIG. 19. The filter size can be made proportional to the number of differential voltages that fall below a prescribed threshold. The maximum size of the filter can be determined by the minimum acceptable resolution of the tool that is used to make the measurements in the borehole. The adaptive averaging filter is designed to ensure smooth variations in the filter length to avoid spikes in the filtered signals. For example, the filter size at a given logging point (given by the number of adjacent logging points to be averaged) might be restricted to change (increase or decrease) by no more than two points, ongoing from one logging point to the next. Filtering can be applied to all measured voltages and currents.

Software focusing, mentioned earlier, is applied at block 1941 of FIG. 19 to convert measured voltages and currents into apparent resistivities Ra1 . . . Ra5 for different depths of investigation. Focusing uses voltages at the monitor electrodes and currents at all excitation electrodes, as is known to those of ordinary skill in the art.

When the SNR for a given measurement scenario is very low, as might occur in highly resistive formations with highly conductive mud, apparent resistivities calculated using software focusing may attain non-physically high (or negative) values. Thus, at block 1945 in FIG. 19, an upper limit is set for apparent resistivities, so that when values of Ra1 . . . Ra5 become larger than the upper limit (or if they are negative), then those values of Ra are set to be equal to the selected upper limit value.

It is known from rock physics that formations with high resistivity (e.g., Rt greater than about 10 kohm-m), are usually made up of non-porous solid rock, such as granite for example, that cannot be invaded with borehole fluids. In those zones, and depending on the borehole size and Rm, the apparent resistivity determined with a deep depth of investigation should change progressively, or have similar values, in the absence of anisotropy. For example, in small boreholes (e.g., boreholes with a diameter of 8 in. or less) with moderate Rm (e.g., an Rm of greater than 0.05 ohm-m), the determined apparent resistivity values Ra2 . . . Ra5 should have similar values in the absence of invasion, with Ra1 being less than Ra2 . . . Ra5. In larger boreholes, or boreholes with highly conductive mud, Ra3 . . . Ra5 should have similar values, with Ra1 and Ra2 taking lower values than Ra3 . . . Ra5.

This information can be used to develop a constraining activity, shown in block 1949 of FIG. 19, that operates to constrain Ra curves associated with zones that have high values of Rt. In this way, physically impossible invasion results are avoided after inversion is applied.

Figure 22:
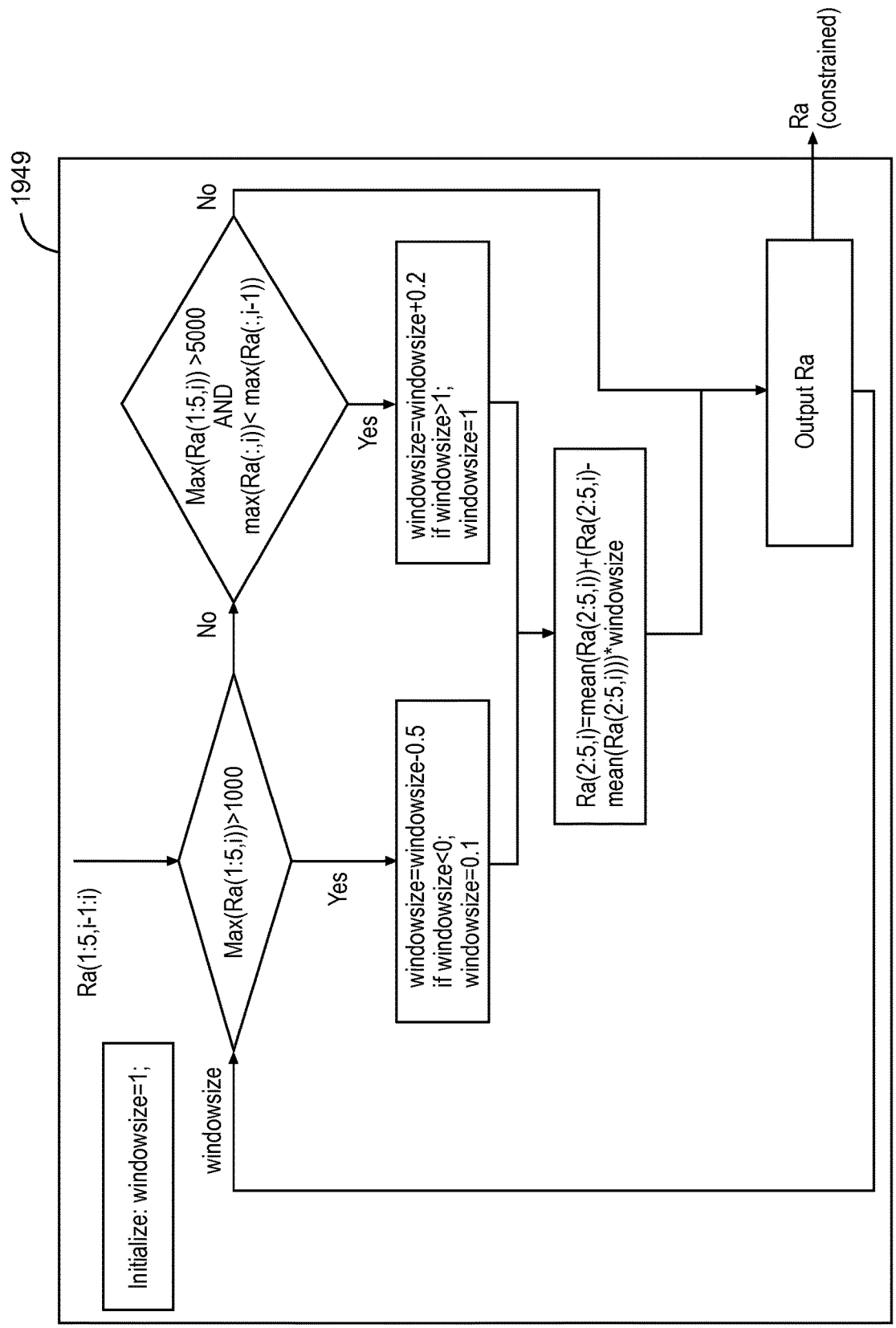
FIG. 22 is a flow diagram illustrating apparent resistivity constraining activity, according to various embodiments of the invention.

FIG. 22 is a flow diagram illustrating apparent resistivity constraining activity 1949, according to various embodiments of the invention. In this example, a small caliper borehole with moderate conductivity mud is assumed, and Ra2 through Ra5 are constrained in zones with a high value of Rt.

In this activity, a variable-size window is used to constrain higher values of Ra. Thus, as values of Rt go above a selected lower threshold (e.g., 1000 ohm-m in FIG. 22), the window size decreases gradually, bringing the Ra curves closer to their mean value. Conversely, as values of Rt drop below a selected upper threshold (e.g., 5000 ohm-m in FIG. 22), with the negative slope exhibited by the Ra curves, the window size increases gradually until it reaches a maximum value of 1.0, leaving the Ra curves at that location unchanged. Borehole size and mud resistivity can be provided as inputs to the Ra constraining activity to determine which Ra curves should be constrained. For example, if borehole size is smaller than a certain threshold and mud resistivity is larger than another threshold, then the constraining algorithm will determine that Ra2 through Ra5 should be constrained according to the constraining embodiment described above. Alternatively, if the borehole size is larger than a certain threshold and/or mud resistivity is smaller than another threshold, the constraining algorithm will determine that only Ra3 through Ra5 should be constrained.

Implementation Examples

The processing shown in FIG. 19 can be applied to raw data measurements to illustrate the effect various types of activity. In this example, data was logged with Rm=0.058 Ohm-m, and a caliper size (BH diameter)=8.2 inches. Different combinations of the correction activities can be used, resulting in different processing schemes. Some of these are summarized in Table 8.

Table 8 summarizes four practical processing schemes (NOCORR, SSORFULL, SSFULL, FULLPROC) obtained from different combinations of the processing activity shown in FIG. 19. For each scheme, the Ra constraining activity may be turned on or off. The results of implementing these schemes will be shown in FIGS. 23-26.

TABLE 8

Summary of some practical processing schemes-*indicates that
impedance correction is applied when the SSA is not activated

| Case | SSA | SSA ADUSTED | IMPEDANCE CORRECTION | AVERAGING |
|---|---|---|---|---|
| NOCORR | No | no | No | No |
| SSORFULL | yes* | no | full* | no |
| SSFULL | Yes | no | Full | no |
| FULLPROC | Yes | yes | Full | yes |

Figure 23:
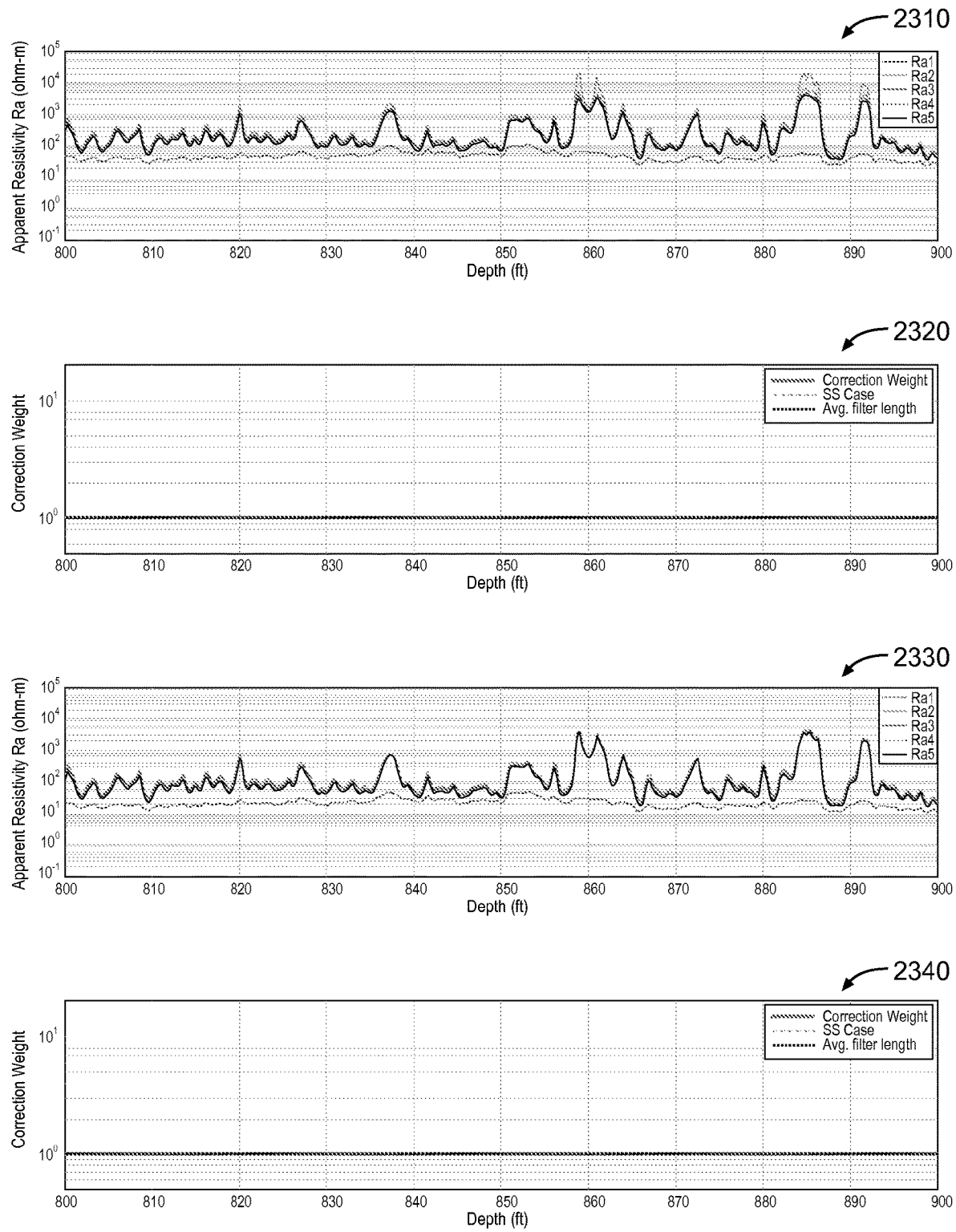
FIG. 23 includes graphs illustrating the results of data processing schemes, without correction (NOCORR), according to various embodiments of the invention.

FIG. 23 includes graphs 2310, 2320, 2330, 2340 illustrating the results of data processing schemes, without correction (NOCORR), according to various embodiments of the invention. In graphs 2310, 2320, constraining is turned off. In graphs 2330, 2340, constraining is turned on.

Figure 24:
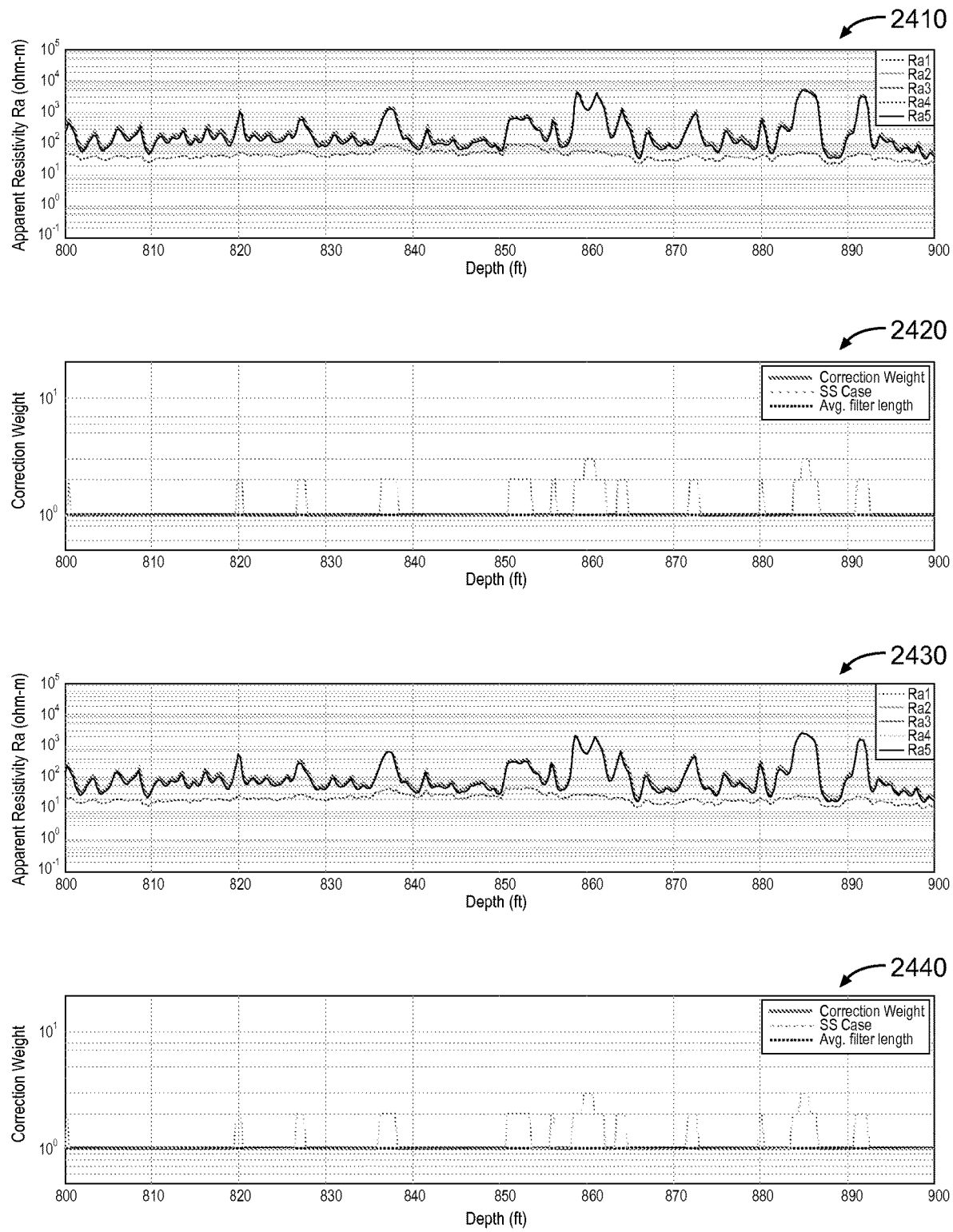
FIG. 24 includes graphs illustrating the results of data processing schemes, with small signal or impedance correction (SSORFULL), according to various embodiments of the invention.

FIG. 24 includes graphs 2410, 2420, 2430, 2440 illustrating the results of data processing schemes, with small signal or impedance correction (SSORFULL), according to various embodiments of the invention. In graphs 2410, 2420, constraining is turned off. In graphs 2430, 2440, constraining is turned on.

Figure 25:
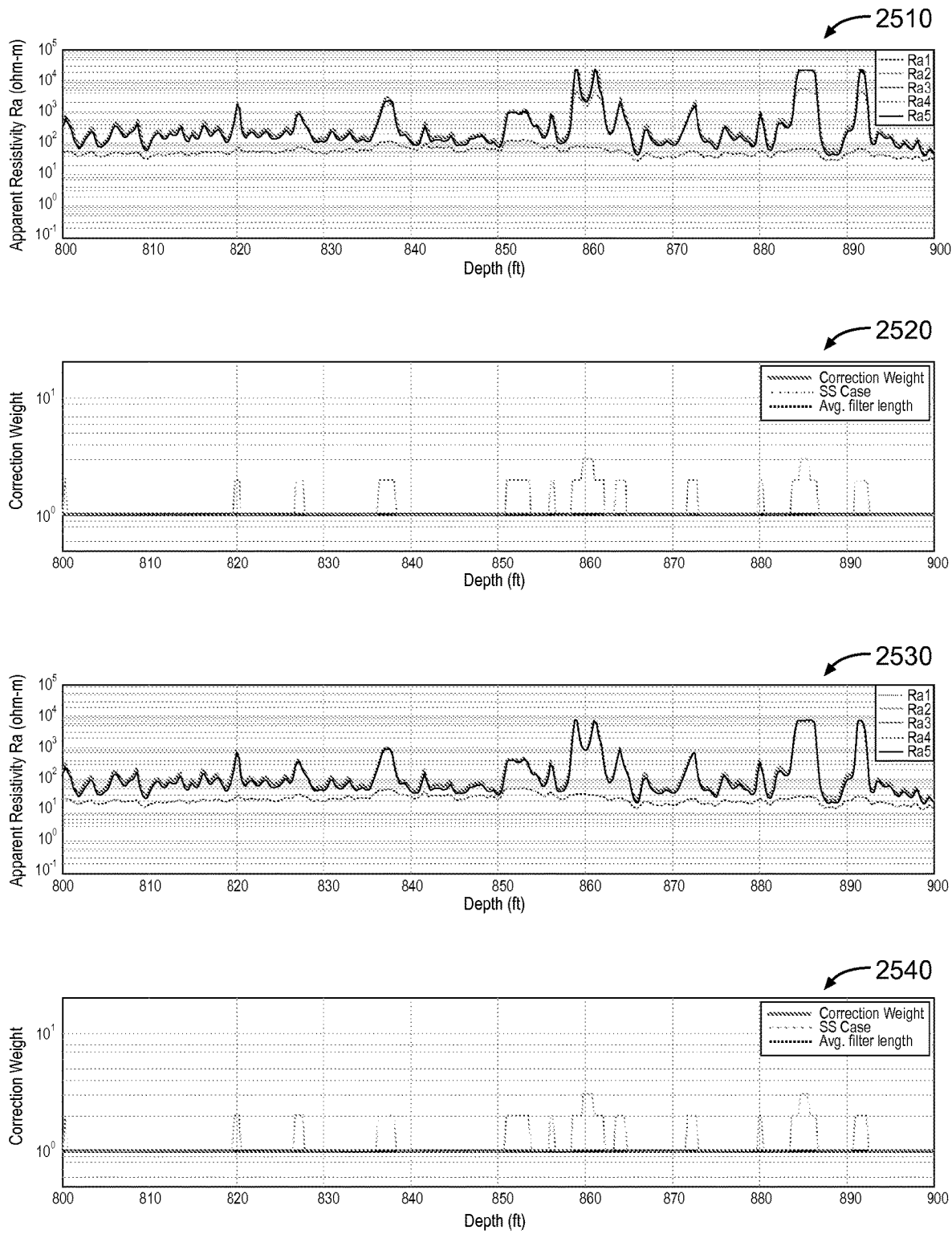
FIG. 25 includes graphs illustrating the results of data processing schemes, with small signal and impedance correction (SSFULL), according to various embodiments of the invention.

FIG. 25 includes graphs 2510, 2520, 2530, 2540 illustrating the results of data processing schemes, with small signal and impedance correction (SSFULL), according to various embodiments of the invention. In graphs 2510, 2520, constraining is turned off. In graphs 2530, 2540, constraining is turned on.

Figure 26:
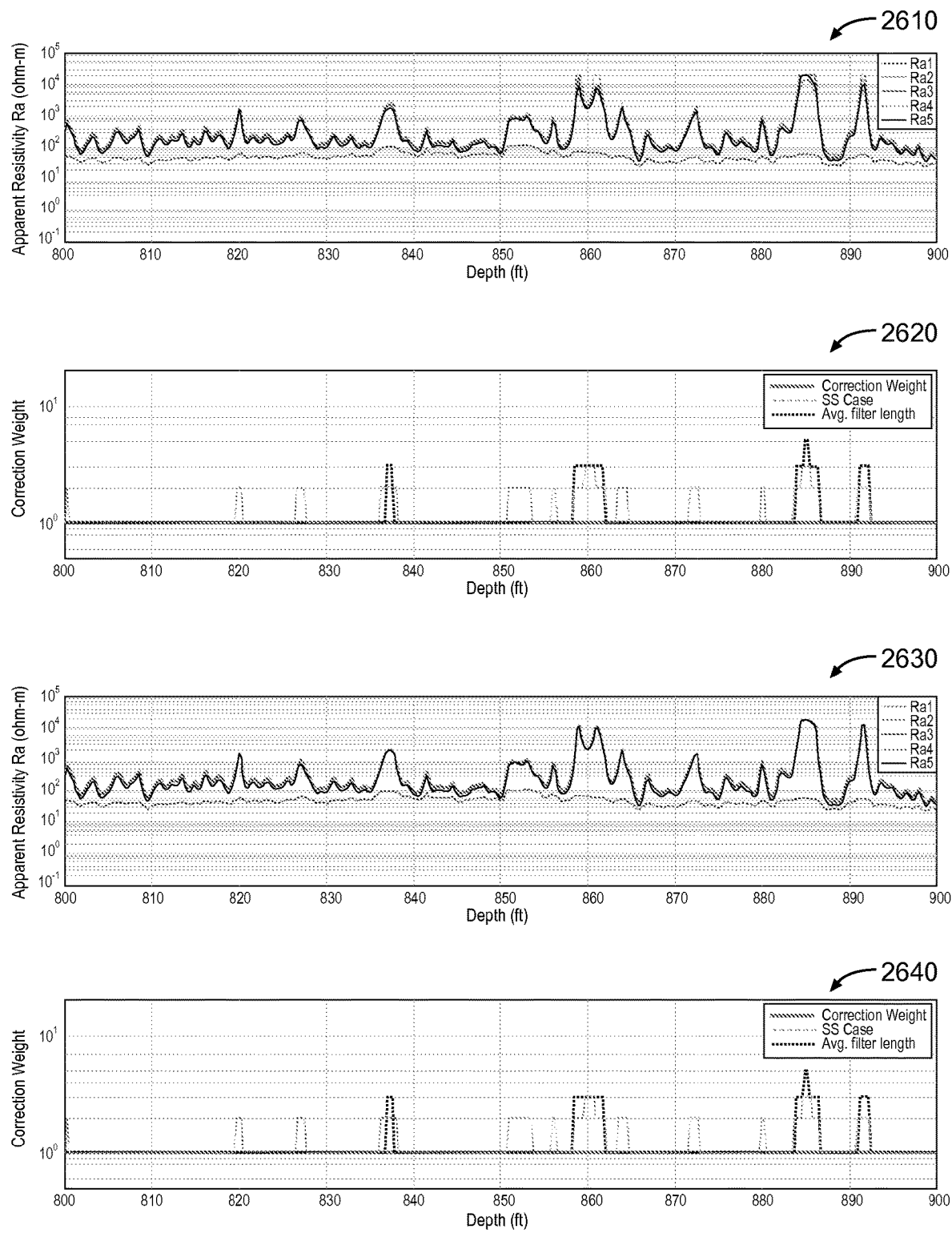
FIG. 26 includes graphs illustrating the results of data processing schemes, with small signal correction, impedance correction, and averaging (FULLPROC), according to various embodiments of the invention.

FIG. 26 includes graphs 2610, 2620, 2630, 2640 illustrating the results of data processing schemes, with small signal correction, impedance correction, and averaging (FULLPROC), according to various embodiments of the invention. In graphs 2610, 2620, constraining is turned off. In graphs 2630, 2640, constraining is turned on.

In FIGS. 23-26, the apparent resistivities associated with a high Rt section of the log are plotted, together with plots of the small signal state, the averaging filter length, and the leakage current correction weights.

The small signal state can take values of 1, 2, or 3 depending on the number of differential voltages replaced by the SSA application. Averaging filter length takes values from 1, indicating no filtering, up to a maximum of 17 points of filter length (corresponding to a minimum vertical resolution of 4 feet in this case). Leakage current correction weight takes values of 0 or 1, indicating whether or not focusing was used to correct for leakage currents due to tool impedance.

Comparing the logs in FIGS. 23-26 shows that the most accurate result in high Rt zones are obtained by using the FULLPROC processing scheme (FIG. 26). Without using impedance correction, as shown in FIG. 23 and FIG. 24, the apparent resistivities (Ra2 through Ra5) in the high Rt zones are under-estimated. Without adjusting the SSA, as shown in FIG. 25, Ra2 is under-estimated. Still further embodiments may be realized.

Apparatus and Systems

Figure 27:
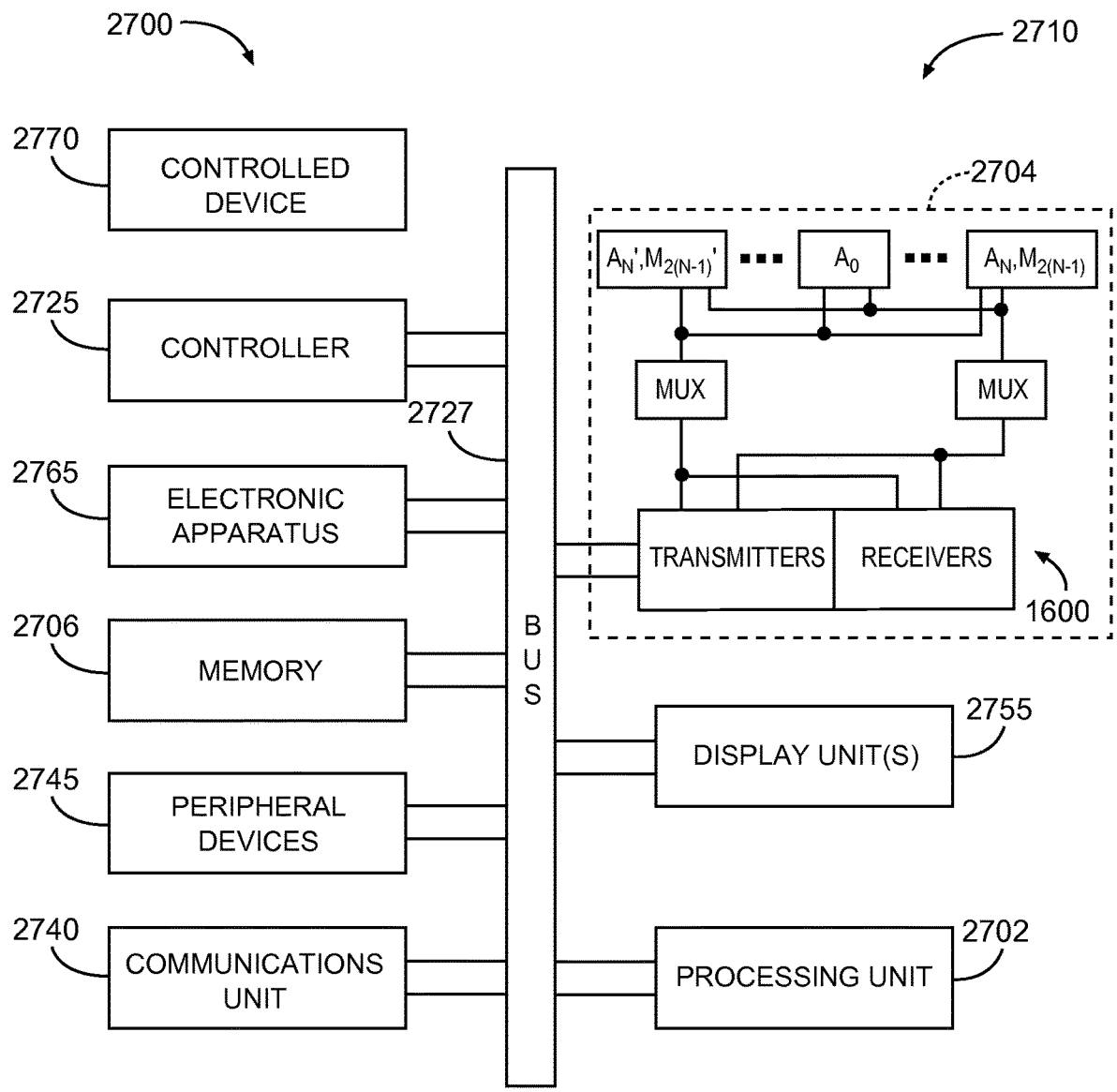
FIG. 27 is a block diagram of systems and apparatus that can operate according to various embodiments of the invention.

For example, FIG. 27 is a block diagram of systems 2700 and apparatus 2710 that can operate according to various embodiments of the invention. Here the 2N guard electrodes ($A_1, A_1', \ldots, A_N, A_N'$) and 4N-4 monitor electrodes ($M_1, M_1', M_2, M_2', \ldots, M_{2(n-1)}, M_{2(N-1)}'$) correspond to the same or similar elements shown in the array of FIG. 16, forming part of a laterolog array tool 1600. One or more multiplexer units MUX may be included in the tool 1600, as well as one or more transmitter/receiver/transceiver units TRANSMITTERS and RECEIVERS, respectively comprising one or more transmitters and/or receivers, and combinations thereof. The processing unit 2702 may comprise a resistivity signal processor.

Here it can be seen that the processing unit 2702 can form part of the system 2700 to control the acquisition and processing of resistivity measurements within the system 2700, using apparatus 2710. In some embodiments, a logging system 2700 comprises one or more of the tools 2710, including a housing 2704. The housing 2704 might take the form of a wireline tool body, or a downhole tool as described in more detail below with reference to FIGS. 14 and 15. The processing unit 2702 may be part of a surface workstation or attached to the housing 2704.

The system 2700, which may comprise a logging system, can include a controller 2725, other electronic apparatus 2765, and a communications unit 2740. The controller 2725 and the processing unit 2702 can be fabricated to operate one or more components of the apparatus 2710 to acquire measurement data, such as resistivity measurements.

Electronic apparatus 2765 (e.g., electromagnetic sensors, etc.) can be used in conjunction with the controller 2725 to perform tasks associated with taking resistivity measurements downhole. The communications unit 2740 can include downhole communications in a drilling operation. Such downhole communications can include telemetry.

The system 2700 can also include a bus 2727 to provide common electrical signal paths between the components of the logging system 2700. The bus 2727 can include an address bus, a data bus, and a control bus, each independently configured. The bus 2727 can also use common conductive lines for providing one or more of address, data, or control, the use of which can be regulated by the controller 2725.

The bus 2727 can include instrumentality for a communication network. The bus 2727 can be configured such that the components of the logging system 2700 are distributed. Such distribution can be arranged between downhole components such as the apparatus 2710 and system 2700, and components that can be disposed on the surface of a well. Alternatively, several of these components can be co-located, such as on one or more collars of a drill string or on a wireline structure.

In various embodiments, the logging system 2700 includes peripheral devices that can include display units 2755, additional storage memory, or other control devices that may operate in conjunction with the controller 2725 or the processing unit 2702. The display unit 2755 can display diagnostic information for the system 2700 based on the signals generated according to embodiments described above. The display unit 2755 can also be used to display one or more graphs of processed measurement data, to include apparent resistivity, similar to or identical to what is illustrated in FIGS. 21 and 23-26.

In an embodiment, the controller 2725 can be fabricated to include one or more processors. The display unit 2755 can be fabricated or programmed to operate with instructions stored in the processing unit 2702 (for example in the memory 2706) to implement a user interface to manage the operation of the logging system 2700 or components distributed within the system 2700. This type of user interface can be operated in conjunction with the communications unit 2740 and the bus 2727. Various components of the logging system 2700 can be integrated such that processing identical to or similar to the methods discussed with respect to various embodiments herein can be performed downhole.

Thus, in various embodiments, a non-transitory machine-readable storage device can include instructions stored thereon, which, when performed by a machine, cause the machine to become a customized, particular machine that performs operations comprising one or more activities similar to or identical to those described with respect to the methods and techniques described herein. A machine-readable storage device, herein, is a physical device that stores information (e.g., instructions, data), which when stored, alters the physical structure of the device. Examples of machine-readable storage devices include, but are not limited to, memory 2706 in the form of read only memory (ROM), random access memory (RAM), a magnetic disk storage device, an optical storage device, a flash memory, and other electronic, magnetic, or optical memory devices, including combinations thereof.

The physical structure of stored instructions may thus be operated on by one or more processors such as, for example, the processing unit 2702. Operating on these physical structures can cause the machine to perform operations according to methods described herein. The instructions can include instructions to cause the processing unit 2702 to store associated data or other data in the memory 2706. The memory 2706 can store the results of measurements of formation parameters or parameters of the system 2700, to include voltage and current measurements, gain parameters, filter parameters, calibration constants, identification data, etc. The memory 2706 can store a log of the voltage and/or current measurements and resistivity measurements obtained by the system 2700. The memory 2706 therefore may include a database, for example a relational database.

Thus, referring to FIGS. 16-27, it can be seen that many embodiments may be realized. For example, a system 2700 may comprise a tool (e.g., apparatus 2710) to make measurements (e.g., voltage and/or current) in a geological formation, and a processing unit 2702 to process the measurements and determine true resistivity values for the formation.

In some embodiments, a system 2700 comprises at least one tool (e.g., apparatus 2710) to measure voltage in a geological formation as measured voltage data. The system 2700 includes a processing unit 2702 coupled to the at least one tool to receive the measured voltage data, with the processing unit capable of operating to correct the measured voltage data for selected weak differential measurements to provide corrected voltage data (e.g., via application of the SSA), to adjust the corrected voltage data to remove level shifts in the measured voltage data caused by the at least one tool impedance to provide adjusted voltage data (e.g., via the SSA adjustment process of FIG. 20), to convert the adjusted voltage data into apparent resistivity data (e.g., via hardware and/or software focusing), and to invert the apparent resistivity data thus obtained to determine true resistivity values for the geological formation.

The system 2700 may include a bit steering mechanism, as a controlled device 2770. Thus, in some embodiments, the system 2700 comprises a bit steering mechanism to operate in response to the true resistivity values determined by the processing unit 2702, to control drilling operations in the geological formation.

The tool may be a laterolog tool. Thus, in the system 2700, the at least one tool comprises an array laterolog tool.

A monitor may operate to keep track of transitions from invaded to non-invaded regions of the formation, and perhaps, to indicate those transitions via a display, alarm, etc. Thus, in some embodiments, the system 2700 comprises a monitor (e.g., in the form of a peripheral device 2745 or a display unit 2755) to indicate transitions from invaded to non-invaded regions of the geological formation, based on the true resistivity values determined by the processing unit 2702.

The apparatus 2710, system 2700, and each of their elements may all be characterized as "modules" herein. Such modules may include hardware circuitry, and/or a processor and/or memory circuits, software program modules and objects, and/or firmware, and combinations thereof, as desired by the architect of the apparatus 2710 and systems 2700, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a formation imaging package, an energy detection and measurement package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 2710 and systems 2700 are intended to provide a general understanding of the structure of various embodiments, and they are not intended to serve as a complete description of all the elements and features of apparatus and systems that might make use of the structures described herein. For example, some embodiments include a number of methods, which will now be described.

Additional Methods

Figure 28:
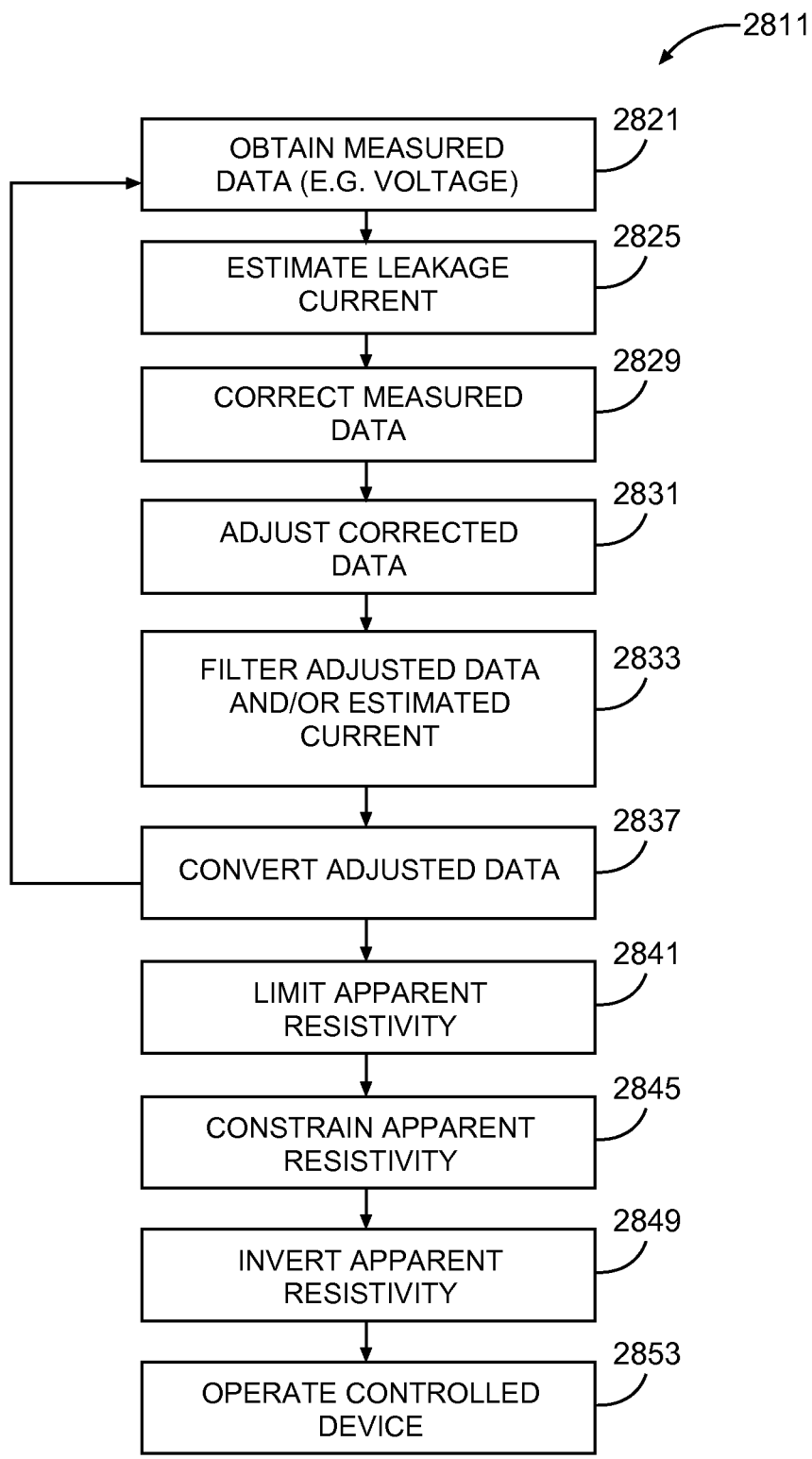
FIG. 28 is a flow chart illustrating additional methods according to various embodiments of the invention.

FIG. 28 is a flow chart illustrating additional methods according to various embodiments of the invention. The methods 2811 may comprise processor-implemented methods, to execute on one or more processors that perform the methods. For example, one embodiment of the methods 2811 may begin at block 2829 with correcting measured voltage data and continue on to adjusting the corrected data at block 2831. This adjusted data may then be converted into apparent resistivity data (e.g., using software focusing) at block 2837, which is inverted at block 2849 to provide the true resistivity of the formation. The true resistivity information, in turn, is used to control a device at block 2853, such as a display or drill bit steering apparatus.

Resistivity measurements can be gathered during wireline or drilling operations. Thus, some embodiments of the method 2811 comprise obtaining measured voltage data from the geological formation during wireline or drilling operations at block 2821.

When full current measurement is not available, leakage current can be estimated. Thus, in some embodiments, the method 2811 comprises estimating leakage current based on the measured resistivity data, to provide estimated leakage current, at block 2825.

In some embodiments, the method 2811 comprises, at block 2829, correcting the measured voltage data for selected weak differential measurements to provide corrected voltage data (e.g., using the SSA).

In some embodiments, the method 2811 comprises, at block 2831, adjusting (e.g., via the activity of block 1929 in FIGS. 19 and 20) the corrected voltage data to remove level shifts in the measured voltage data caused by downhole tool impedance to provide adjusted voltage data.

Adjusting the corrected voltage data may include the subtraction of arrays. Thus, in some embodiments, the activity of adjusting at block 2831 comprises a differencing operation between raw monitor electrode data, forming part of the measured voltage data, and the corrected voltage data comprising approximations of the weak differential measurements.

Adjusting the corrected voltage data may include the application of a filter to remove noise. Thus, in some embodiments, the activity of adjusting at block 2831, comprises high-pass filtering results of the differencing operation to obtain noise data, and subtracting the noise data from the raw monitor electrode data to provide the adjusted voltage data.

The adjusted resistivity data (and estimated leakage current) can be averaged to improve the SNR in some cases. Thus, in some embodiments, the method 2811 comprises, at block 2833, filtering at least one of the adjusted resistivity data or the estimated leakage current with an adaptive filter.

The method 2811, in some embodiments, may continue on to block 2837 to comprise converting (e.g., via software and/or hardware focusing) the adjusted voltage data into apparent resistivity data.

The apparent resistivity data can be limited to accommodate low SNR conditions. Thus, the method 2811 may include, in some embodiments, limiting out of range or negative ones of the apparent resistivity data, at block 2841. In some embodiments, the activity at block 2841 comprises limiting the apparent resistivity data to an upper limit value.

The apparent resistivity data can be constrained to smooth transitions in apparent resistivity in the presence of anisotropy. Thus, some embodiments of the method 2811 comprise, at block 2845, constraining the apparent resistivity data to provide an ordered, physically feasible progression of resistivity data.

The constraining may comprise a windowing operation, with a window that changes in size according to the magnitude of the apparent resistivity values. Thus, the activity at block 2845 may comprise decreasing the window size for values of the apparent resistivity data above a lower threshold value to bring curves of the apparent resistivity data toward a mean value.

The window size may be increased to allow apparent resistivity curves to take on different values. Thus, the activity at block 2845 may comprise increasing the window size for values of the apparent resistivity data below an upper threshold value. In some embodiments, the window size may be increased up to a limited maximum window size.

The method 2811 may continue on to block 2849 to include inverting the apparent resistivity data to determine true resistivity values for a geological formation. During the inversion, invasion resistivity values may be set equal to MSFL resistivity values. Thus, in some embodiments, the activity at block 2849 includes equating invasion resistivity Rxo values to be substantially equivalent to micro-spherically focused log resistivity values as one of plural radial 1D inversion products.

The method 2811 may continue on to block 2853 to include operating a controlled device according to the true resistivity values for the geological formation. For example, the geological formation true resistivity values that result from the method can be used to control drilling operations. Thus, operating the controlled device at block 2853 may comprise controlling drilling operations in the geological formation based on the true resistivity values for the geological formation.

The geological formation true resistivity values can be used to steer the bit. Thus, the activity at block 2853 may include controlling drilling operations by operating a geosteering device to select a drilling direction in the geological formation, based on the true resistivity values for the geological formation.

The true resistivity values can be published for viewing, perhaps in the form of 2-D or 3-D graphs. Thus, in some embodiments, the activity of operating a controlled device at block 2853 comprises publishing at least some of the true resistivity values for the geological formation in a human-readable form.

The true resistivity values can be stored for transportation, perhaps in a storage device that can be transported or that can be used to provide copies of the values, either directly, or remotely, via a network, including the Internet. Thus, in some embodiments, the activity of operating a controlled device at block 2853 comprises recording at least some of the true resistivity values for the geological formation in non-transitory medium.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 19-20, 22, and 28) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein.

For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or inter-process communication techniques, including remote procedure calls. The teachings of various embodiments are not limited to any particular programming language or environment. Thus, other embodiments may be realized.

In some embodiments, a method comprises correcting measured voltage data for selected weak differential measurements to provide corrected voltage data, adjusting the corrected voltage data to remove level shifts in the measured voltage data caused by downhole tool impedance to provide adjusted voltage data, converting the adjusted voltage data into apparent resistivity data, inverting the apparent resistivity data to determine true resistivity values for a geological formation, and operating a controlled device according to the true resistivity values for the geological formation.

In some embodiments, operating the controlled device further comprises controlling drilling operations in the geological formation based on the true resistivity values for the geological formation. In some embodiments, controlling the drilling operations comprises operating a geosteering device to select a drilling direction in the geological formation, based on the true resistivity values for the geological formation.

In some embodiments, operating the controlled device comprises publishing at least some of the true resistivity values for the geological formation in a human-readable form, such as on a hardcopy printout, or on a display. In some embodiments, operating the controlled device comprises recording at least some of the true resistivity values for the geological formation in a non-transitory medium, such as a non-volatile memory, a hard disk, or a CD-ROM or DVD.

The activity of adjusting the corrected voltage data comprises, in some embodiments, a differencing operation between raw monitor electrode data, forming part of the measured voltage data, and the corrected voltage data comprising approximations of the weak differential measurements. This activity may further comprise high-pass filtering results of the differencing operation to obtain noise data, and subtracting the noise data from the raw monitor electrode data to provide the adjusted voltage data.

In some embodiments, a method comprises estimating leakage current based on the measured resistivity data, to provide estimated leakage current. In some embodiments, the method comprises filtering at least one of the adjusted resistivity data or the estimated leakage current with an adaptive filter.

In some embodiments, a method comprises limiting out of range or negative ones of the apparent resistivity data. The activity of limiting may further comprise limiting the apparent resistivity data to an upper limit value.

In some embodiments, a method comprises constraining the apparent resistivity data to provide an ordered, physically feasible progression of resistivity data. The constraining activity may further comprise decreasing the window size for values of the apparent resistivity data above a lower threshold value to bring curves of the apparent resistivity data toward a mean value and/or increasing the window size for values of the apparent resistivity data below an upper threshold value to allow apparent resistivity curves to take different values. The window size may be increased up to a limited maximum window size in some embodiments.

In some embodiments, the activity of inverting comprises equating invasion resistivity Rxo values to be substantially equivalent to micro-spherically focused log resistivity values as one of plural radial 1D inversion products.

In some embodiments, a method comprises obtaining the measured voltage data from the geological formation during wireline or drilling operations.

In some embodiments, a system comprises at least one tool to measure voltage in a geological formation as measured voltage data, and a processing unit coupled to the at least one tool to receive the measured voltage data, the processing unit to operate to correct the measured voltage data for selected weak differential measurements to provide corrected voltage data, to adjust the corrected voltage data to remove level shifts in the measured voltage data caused by the at least one tool impedance to provide adjusted voltage data, to convert the adjusted voltage data into apparent resistivity data, and to invert the apparent resistivity data to determine true resistivity values for the geological formation. In some embodiments, the at least one tool comprises an array laterolog tool.

In some embodiments, the system comprises a bit steering mechanism to operate in response to the true resistivity values determined by the processing unit, to control drilling operations in the geological formation.

In some embodiments, the system comprises one or more monitors to indicate transitions from invaded to non-invaded regions of the geological formation, based on the true resistivity values determined by the processing unit.

In summary, the apparatus, systems, and methods disclosed can operate to improve the accuracy and operational range of array laterolog tools. Traditionally, attempts to reduce errors included mechanical and electrical solutions that reduce coupling between electrodes and thermal noise. In other cases, the number of measurements was increased to reduce noise effects by averaging. Other attempts included reducing the tool dimensions or increasing the emitted current in order to increase the monitor electrode voltages. All such solutions, while useful, are generally undesirable and inefficient in terms of time needed to acquire the extra data, or the cost of achieving the end result. As a matter of contrast, the apparatus, systems, and methods described herein are relatively inexpensive to implement, with little or no modification of the tool, while dramatically improving tool measurement performance in the presence of noise. As a result, the value of services provided by an operation/exploration company may be significantly enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Example 1 is a method comprising correcting measured voltage data for selected weak differential measurements to provide corrected voltage data; adjusting the corrected voltage data to remove level shifts in the measured voltage data caused by downhole tool impedance to provide adjusted voltage data; converting the adjusted voltage data into apparent resistivity data; inverting the apparent resistivity data to determine true resistivity values for a geological formation; and operating a controlled device according to the true resistivity values for the geological formation.

In Example 2, the subject matter of Example 1 may further include controlling drilling operations in the geological formation based on the true resistivity values for the geological formation.

In Example 3, the subject matter of Examples 1-2 may further include operating a geosteering device to select a drilling direction in the geological formation, based on the true resistivity values for the geological formation.

In Example 4, the subject matter of Examples 1-3 may further include publishing at least some of the true resistivity values for the geological formation in a human-readable form.

In Example 5, the subject matter of Examples 1-4 may further include recording at least some of the true resistivity values for the geological formation in non-transitory medium.

In Example 6, the subject matter of Examples 1-5 may further include a differencing operation between raw monitor electrode data, forming part of the measured voltage data, and the corrected voltage data comprising approximations of the weak differential measurements.

In Example 7, the subject matter of Examples 1-6 may further include: high-pass filtering results of the differencing operation to obtain noise data; and subtracting the noise data from the raw monitor electrode data to provide the adjusted voltage data.

In Example 8, the subject matter of Examples 1-7 may further include estimating leakage current based on the measured resistivity data, to provide estimated leakage current.

In Example 9, the subject matter of Examples 1-8 may further include filtering at least one of the adjusted resistivity data or the estimated leakage current with an adaptive filter.

In Example 10, the subject matter of Examples 1-9 may further include limiting out of range or negative ones of the apparent resistivity data.

In Example 11, the subject matter of Examples 1-10 may further include limiting the apparent resistivity data to an upper limit value.

In Example 12, the subject matter of Examples 1-11 may further include constraining the apparent resistivity data to provide a physically feasible progression of resistivity data.

In Example 13, the subject matter of Examples 1-12 may further include decreasing a window size for values of the apparent resistivity data above a lower threshold value to bring curves of the apparent resistivity data toward a mean value.

In Example 14, the subject matter of Examples 1-13 may further include increasing the window size for values of the apparent resistivity data below an upper threshold value to allow apparent resistivity curves to take different values.

In Example 15, the subject matter of Examples 1-14 may further include wherein the window size may be increased up to a limited maximum window size.

In Example 16, the subject matter of Examples 1-15 may further include equating invasion resistivity Rxo values to be substantially equivalent to micro-spherically focused log resistivity values as one of plural radial one-dimensional inversion products.

In Example 17, the subject matter of Examples 1-16 may further include obtaining the measured voltage data from the geological formation during wireline or drilling operations.

Example 18 is a system, comprising at least one tool to measure voltage in a geological formation as measured voltage data; and a processing unit coupled to the at least one tool to receive the measured voltage data, the processing unit to operate to correct the measured voltage data for selected weak differential measurements to provide corrected voltage data, to adjust the corrected voltage data to remove level shifts in the measured voltage data caused by the at least one tool impedance to provide adjusted voltage data, to convert the adjusted voltage data into apparent resistivity data, and to invert the apparent resistivity data to determine true resistivity values for the geological formation.

In Example 19, the subject matter of Example 18 may further include a bit steering mechanism to operate in response to the true resistivity values determined by the processing unit, to control drilling operations in the geological formation.

In Example 20, the subject matter of Examples 18-19 may further include wherein the at least one tool comprises an array laterolog tool.

In Example 21, the subject matter of Examples 18-20 may further include a monitor to indicate transitions from invaded to non-invaded regions of the geological formation, based on the true resistivity values determined by the processing unit.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   correcting a measured voltage data for selected weak differential measurements to provide corrected voltage data wherein the voltage data was obtained through a tool having current electrodes, return electrodes, and monitoring electrodes downhole in a geological formation;
   adjusting the corrected voltage data to remove level shifts in the measured voltage data caused by downhole tool impedance to provide adjusted voltage data;
   converting the adjusted voltage data into apparent resistivity data; and inverting the apparent resistivity data to determine true resistivity values for a geological formation, wherein the adjusting comprises a differencing operation between raw monitor electrode data, forming part of the measured voltage data, and the corrected voltage data comprising approximations of the weak differential measurements.

2. The method according to claim 1, further comprising:
   controlling drilling operations in the geological formation based on the true resistivity values for the geological formation.

3. The method according to claim 2, wherein controlling the drilling operations comprises:
   operating a geosteering device to select a drilling direction in the geological formation, based on the true resistivity values for the geological formation.

4. The method according to claim 1, further comprising:
   publishing at least some of the true resistivity values for the geological formation in a human-readable form.

5. The method according to claim 1, further comprising:
   recording at least some of the true resistivity values for the geological formation in non-transitory medium.

6. The method according to claim 1, further comprising:
   high-pass filtering results of the differencing operation to obtain noise data; and subtracting the noise data from the raw monitor electrode data to provide the adjusted voltage data.

7. The method according to claim 1, further comprising:
estimating leakage current based on the measured voltage data and electrode impedance, to provide estimated leakage current.

8. The method according to claim 7, further comprising:
filtering at least one of the adjusted voltage data or the estimated leakage current with an adaptive filter.

9. The method according to claim 1, further comprising:
limiting out of range or negative ones of the apparent resistivity data.

10. The method according to claim 9, wherein the limiting further comprises: limiting the apparent resistivity data to an upper limit value.

11. The method according to claim 1, further comprising:
constraining the apparent resistivity data to provide a physically feasible progression of resistivity data.

12. The method according to claim 11, further comprising:
decreasing a window size for values of the apparent resistivity data above a lower threshold value to bring curves of the apparent resistivity data toward a mean value.

13. The method according to claim 12, further comprising:
increasing the window size for values of the apparent resistivity data below an upper threshold value to allow apparent resistivity curves to take different values.

14. The method according to claim 13, wherein the window size may be increased up to a limited maximum window size.

15. The method according to claim 1, wherein the inverting comprises equating invasion resistivity Rxo values to be substantially equivalent to micro-spherically focused log resistivity values as one of plural radial one-dimensional inversion products.

16. The method according to claim 1, further comprising:
obtaining the measured voltage data from the geological formation during wireline or drilling operations.

17. A system, comprising:
at least one tool to measure voltage downhole in a geological formation as measured voltage data, wherein the tool has current electrodes, return electrodes, and monitoring electrodes, wherein the current electrodes outputs current which is received by the return electrodes, and wherein the monitoring electrodes measures the voltage based on the current; and
a processing unit coupled to the at least one tool to receive the measured voltage data, the processing unit to operate to correct the measured voltage data for selected weak differential measurements to provide corrected voltage data, to adjust the corrected voltage data to remove level shifts in the measured voltage data caused by the at least one tool impedance to provide adjusted voltage data, to convert the adjusted voltage data into apparent resistivity data, and to invert the apparent resistivity data to determine true resistivity values for the geological formation, wherein the adjusting comprises a differencing operation between raw monitor electrode data, forming part of the measured voltage data, and the corrected voltage data comprising approximations of the weak differential measurements.

18. The system according to claim 17, further comprising:
a bit steering mechanism to operate in response to the true resistivity values determined by the processing unit, to control drilling operations in the geological formation.

19. The system according to claim 17, wherein the at least one tool comprises an array laterolog tool.

20. The system according to claim 17, further comprising:
a monitor to indicate transitions from invaded to non-invaded regions of the geological formation, based on the true resistivity values determined by the processing unit.

21. The system according to claim 17, further comprising:
high-pass filtering results of the differencing operation to obtain noise data; and
subtracting the noise data from the raw monitor electrode data to provide the adjusted voltage data.

* * * * *